US011092456B2

(12) United States Patent
Mangal et al.

(10) Patent No.: US 11,092,456 B2
(45) Date of Patent: Aug. 17, 2021

(54) OBJECT LOCATION INDICATOR SYSTEM AND METHOD

(71) Applicant: Aptiv Technologies Limited, St. Michael (BB)

(72) Inventors: Nandita Mangal, Palo Alto, CA (US); Michael H. Laur, Mission Viejo, CA (US)

(73) Assignee: Aptiv Technologies Limited, St. Michael (BB)

( * ) Notice: Subject to any disclaimer, the term of this patent is extended or adjusted under 35 U.S.C. 154(b) by 164 days.

(21) Appl. No.: 16/297,089

(22) Filed: Mar. 8, 2019

(65) Prior Publication Data

US 2020/0284607 A1 Sep. 10, 2020

(51) Int. Cl.
  *G01C 21/36* (2006.01)
  *H04W 4/40* (2018.01)
  *G01S 17/08* (2006.01)
  *G01S 17/89* (2020.01)
  *G06K 9/00* (2006.01)

(52) U.S. Cl.
  CPC .......... *G01C 21/3632* (2013.01); *G01S 17/08* (2013.01); *G01S 17/89* (2013.01); *G06K 9/00805* (2013.01); *G06K 9/00825* (2013.01); *H04W 4/40* (2018.02)

(58) Field of Classification Search
  CPC ............ G01C 21/3632; G01C 21/3438; G06Q 50/30; G01S 19/03; B60W 60/00253; G05D 1/021
  See application file for complete search history.

(56) References Cited

U.S. PATENT DOCUMENTS

| | | | |
|---|---|---|---|
| 6,970,591 B1* | 11/2005 | Lyons | G06K 9/209 345/419 |
| 9,997,072 B2* | 6/2018 | Hu | G08G 1/09623 |
| 10,462,621 B2* | 10/2019 | Rowe | H04M 3/42348 |
| 2004/0093280 A1 | 5/2004 | Yamaguchi | |
| 2006/0187238 A1* | 8/2006 | Yoneji | B60R 1/00 345/629 |
| 2011/0242356 A1* | 10/2011 | Aleksic | H04N 5/23238 348/222.1 |
| 2015/0130942 A1* | 5/2015 | Fujita | B60R 1/00 348/148 |

(Continued)

FOREIGN PATENT DOCUMENTS

WO  02/06994 A2  1/2002

OTHER PUBLICATIONS

"Extended European Search Report", EP Application No. 20159850.5, dated Aug. 3, 2020, 8 pages.

*Primary Examiner* — James J Lee
*Assistant Examiner* — Wenyuan Yang
(74) *Attorney, Agent, or Firm* — Colby Nipper PLLC

(57) ABSTRACT

A method of operating as object indicator module includes capturing at least one image, said captured image covers at least a portion of an environment of a subject, determining a location of an object relative to the environment of the subject, in response to determining the location of the object, determining modifications of the at least one captured image to generate a modified image that indicates the location of the object relative to the environment, and causing the modified image to be presented on at least one display.

19 Claims, 21 Drawing Sheets

(56) References Cited

U.S. PATENT DOCUMENTS

| | | | |
|---|---|---|---|
| 2015/0213306 A1* | 7/2015 | Hou | H04N 7/183 |
| | | | 382/118 |
| 2016/0116736 A1* | 4/2016 | Andersson | G03B 21/206 |
| | | | 353/13 |
| 2017/0343375 A1* | 11/2017 | Kamhi | G01C 21/3407 |
| 2018/0157268 A1 | 6/2018 | Mangal et al. | |
| 2018/0196417 A1* | 7/2018 | Iagnemma | G05D 1/0027 |
| 2018/0349699 A1 | 12/2018 | O'Connell et al. | |
| 2018/0365893 A1 | 12/2018 | Mullins | |
| 2019/0017839 A1 | 1/2019 | Eyler et al. | |
| 2019/0065852 A1 | 2/2019 | Badalamenti et al. | |
| 2019/0149725 A1* | 5/2019 | Adato | H04N 1/32144 |
| | | | 348/158 |
| 2019/0347855 A1* | 11/2019 | Goslin | G06T 7/74 |
| 2020/0151916 A1* | 5/2020 | Kenney | G06T 11/00 |
| 2020/0223352 A1* | 7/2020 | Toshio Kimura | G05D 1/0088 |

* cited by examiner

OBJECT LOCATION INDICATOR SYSTEM AND METHOD

FIELD OF THE INVENTION

This description relates to the provision of transport vehicles, and, more specifically, to techniques for improvements in communication with a subject passenger of a transport vehicle system.

BACKGROUND

In recent years, ride-sharing applications have become popular as an alternative means of transportation to traditional self-owned cars, car rentals, taxis, shuttles, and the like. A typical ride-sharing application executes on a mobile device, such as a smart phone, of a transportation subject (user). Such a ride-sharing application allows the transportation subject to enter a start point (typically where the subject is currently located), and a destination (where the user seeks transport to). The ride-sharing application may provide the user with an estimated arrival time of a vehicle.

Some ride-sharing applications provide a user with an indication of a current location of a transportation vehicle as the vehicle travels to the start point indicated by the subject user. Such an indication typically includes a representation of a map of a region surrounding the subject user, as well as an indication of a current location of the vehicle overlaid on the representation of the map.

SUMMARY

Techniques are provided for capturing at least one image, where the captured image covers at least a portion of an environment of a subject; determining a location of an object relative to the environment of the subject; in response to determining the location of the object, determining modifications of the captured image to generate a modified image that indicates the location of the object relative to the environment; and causing the modified image to be presented on at least one display.

A system is provided that includes an object indicator module that captures at least one image, where the captured image covers at least a portion of an environment of a subject. The system determines a location of an object relative to the environment of the subject; in response to determining the location of the object, determines modifications of the captured image to generate a modified image that indicates the location of the object relative to the environment; and cause the modified image to be presented on at least one display.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
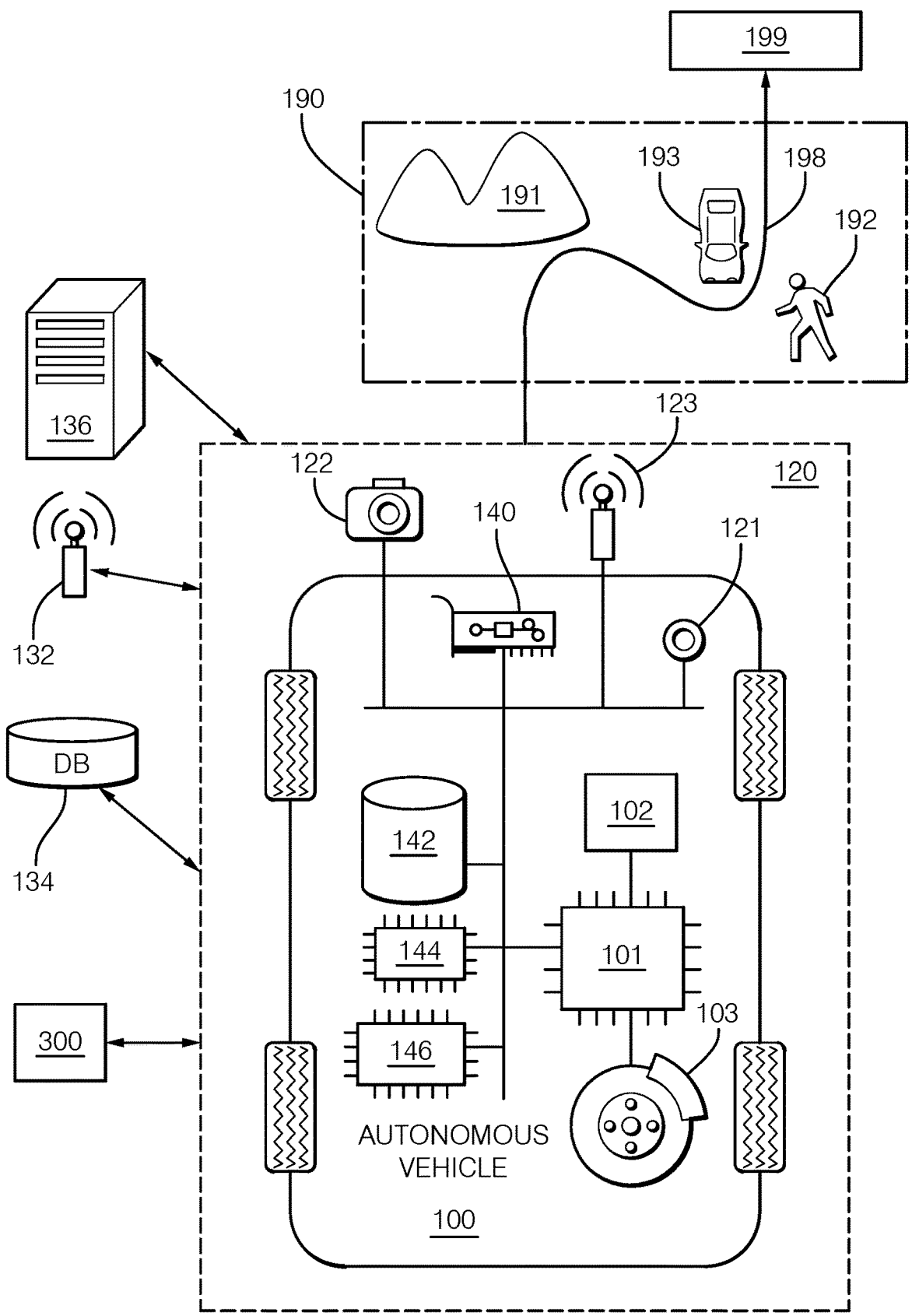
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Object Indicator Module System and Method General Overview Described herein is a system and a method that captures an image of an area, determines a location of an object relative to the area, determines modifications of the captured image to indicate the location of the object relative to the area, and causes the modified image to be presented on a display.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure, e.g. a list or data stream, that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, Internet of Things (IoT) device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., Wi-Fi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
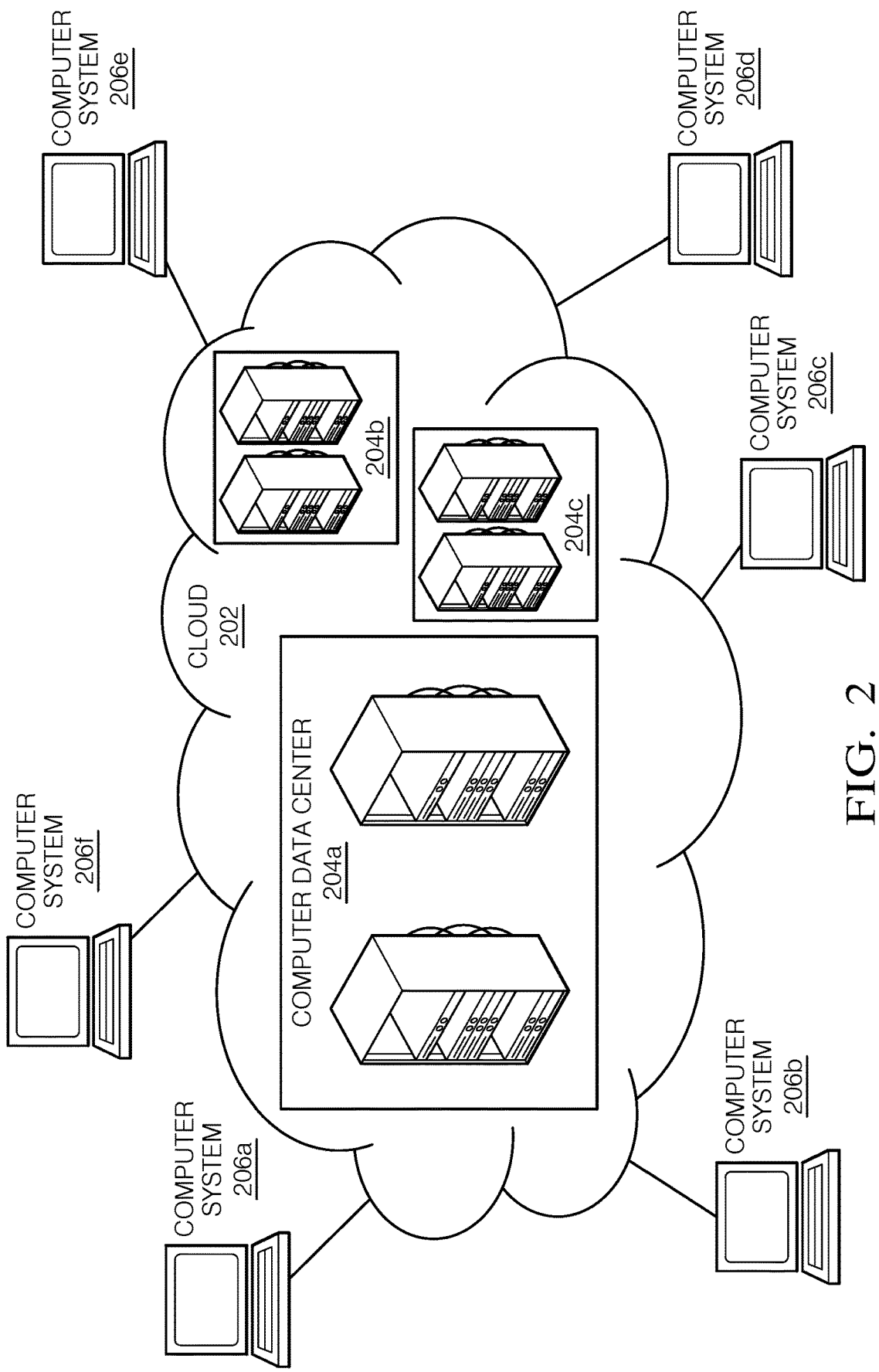
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smart phones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
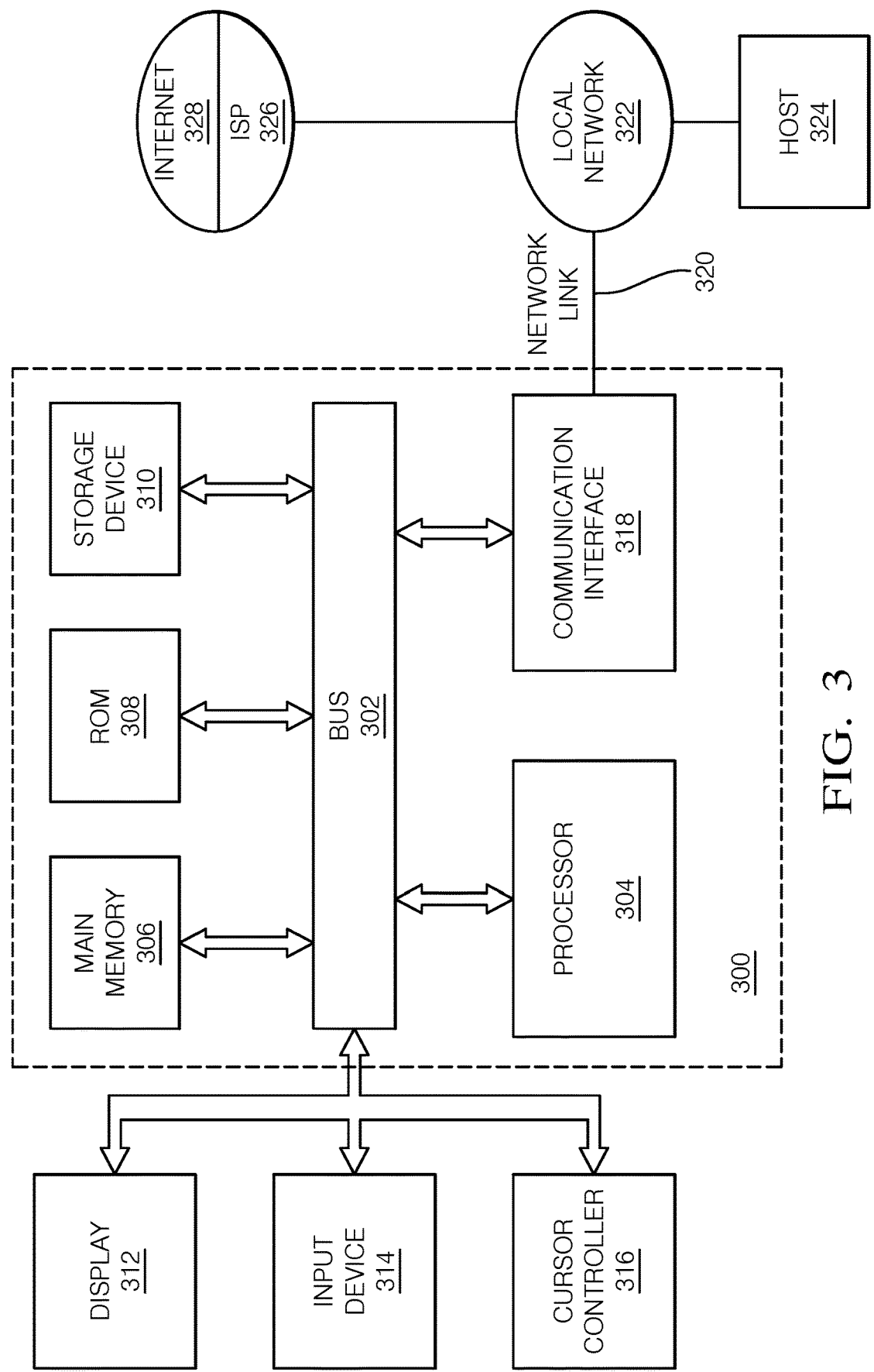
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
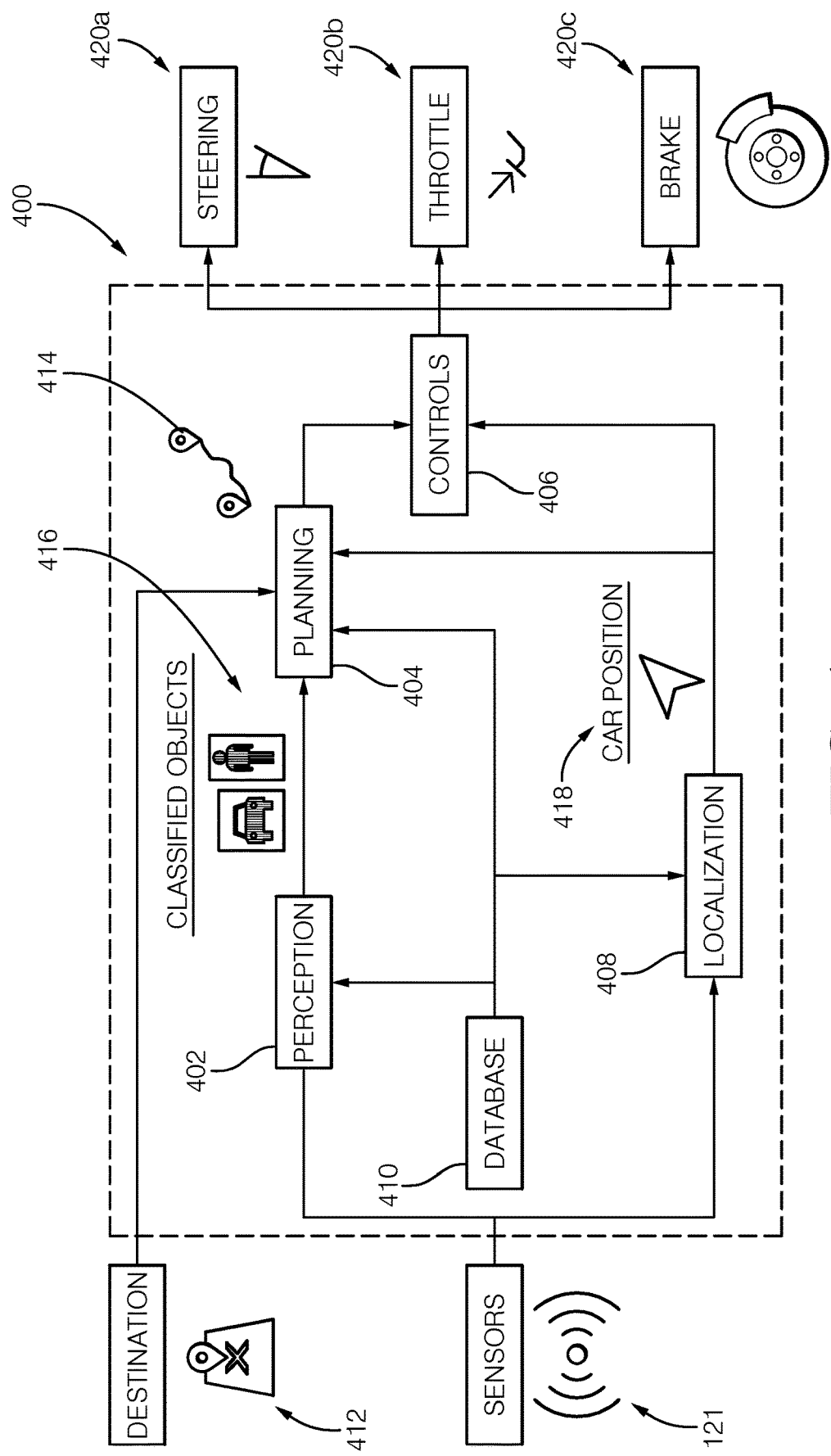
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
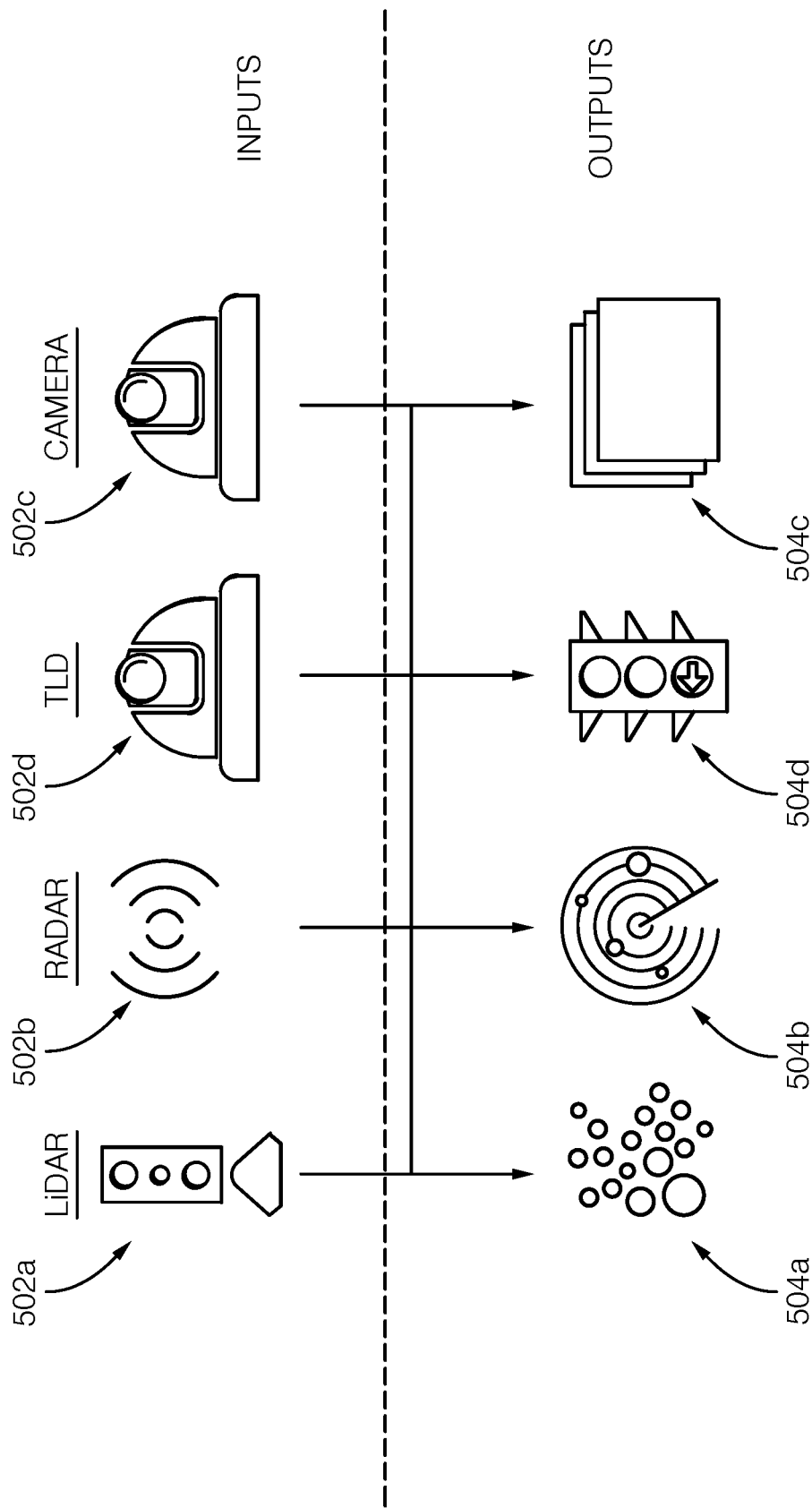
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
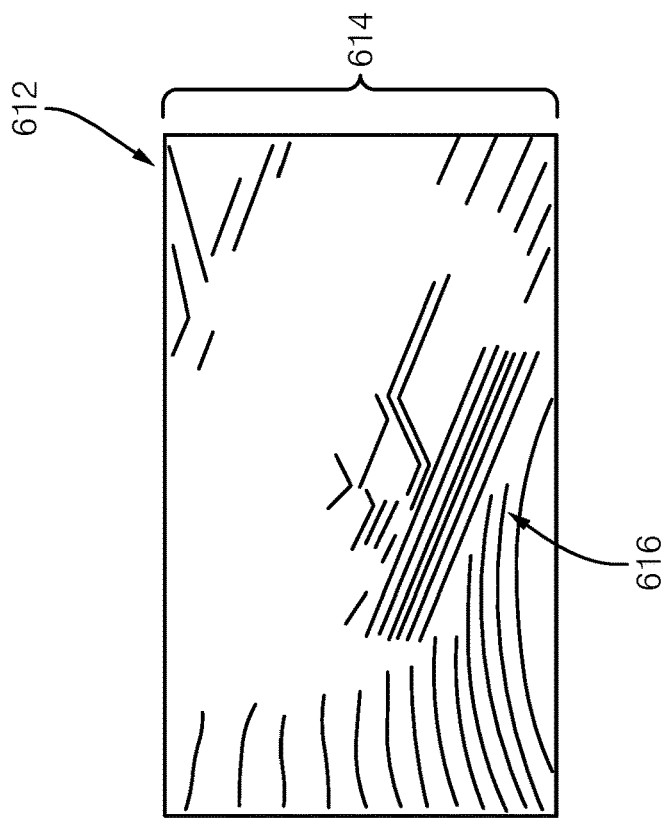
FIG. 6 shows an example of a LiDAR system.
Figure 6:
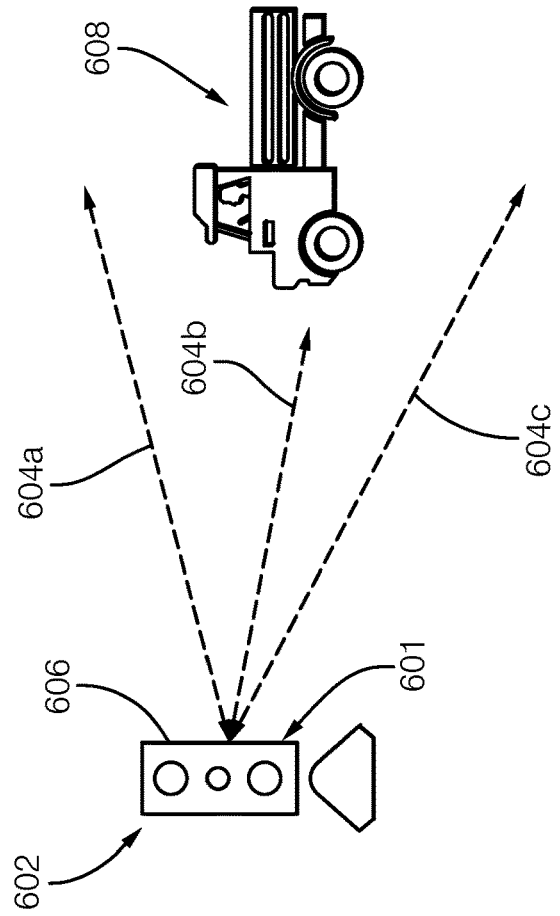

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
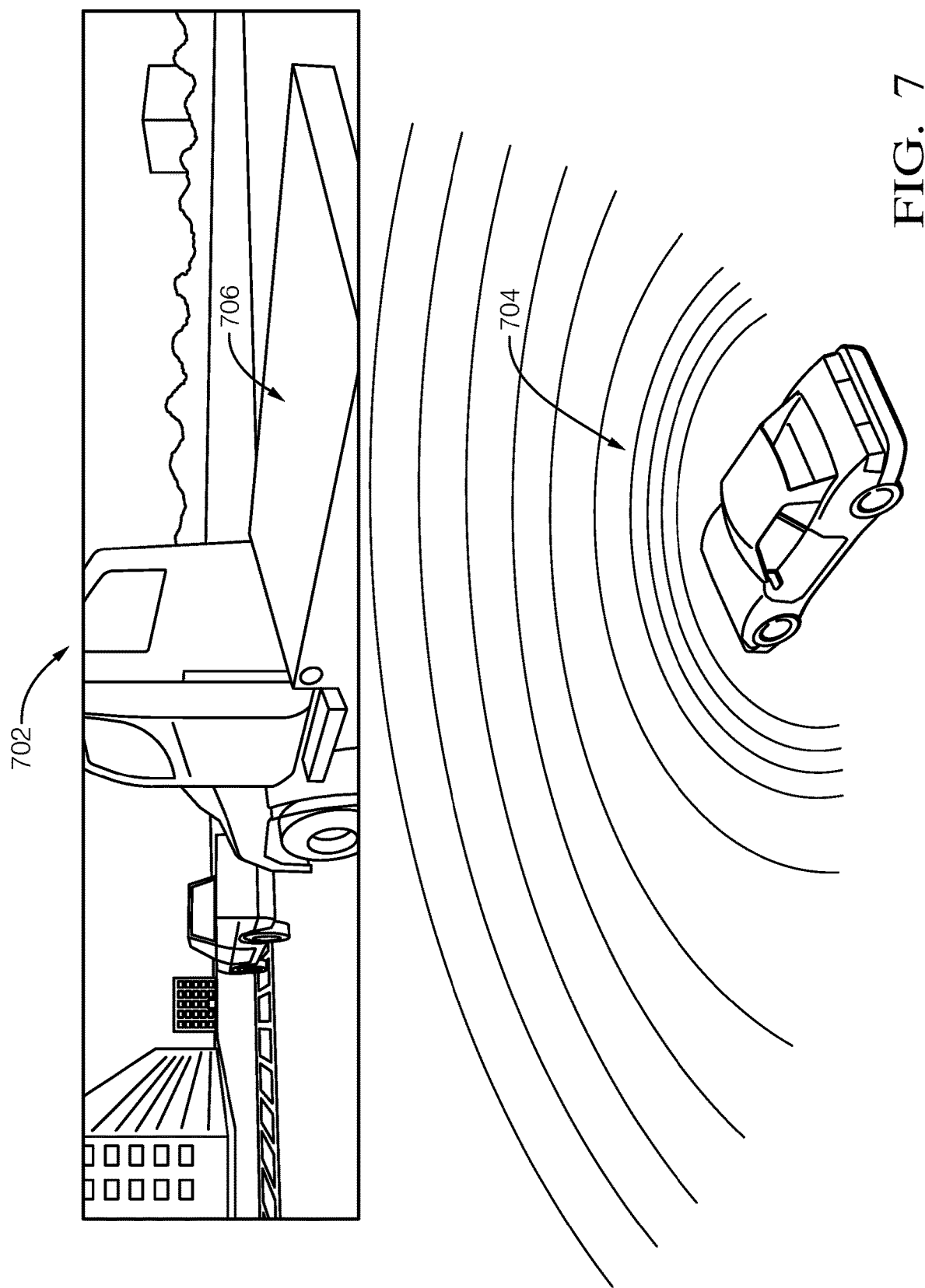
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
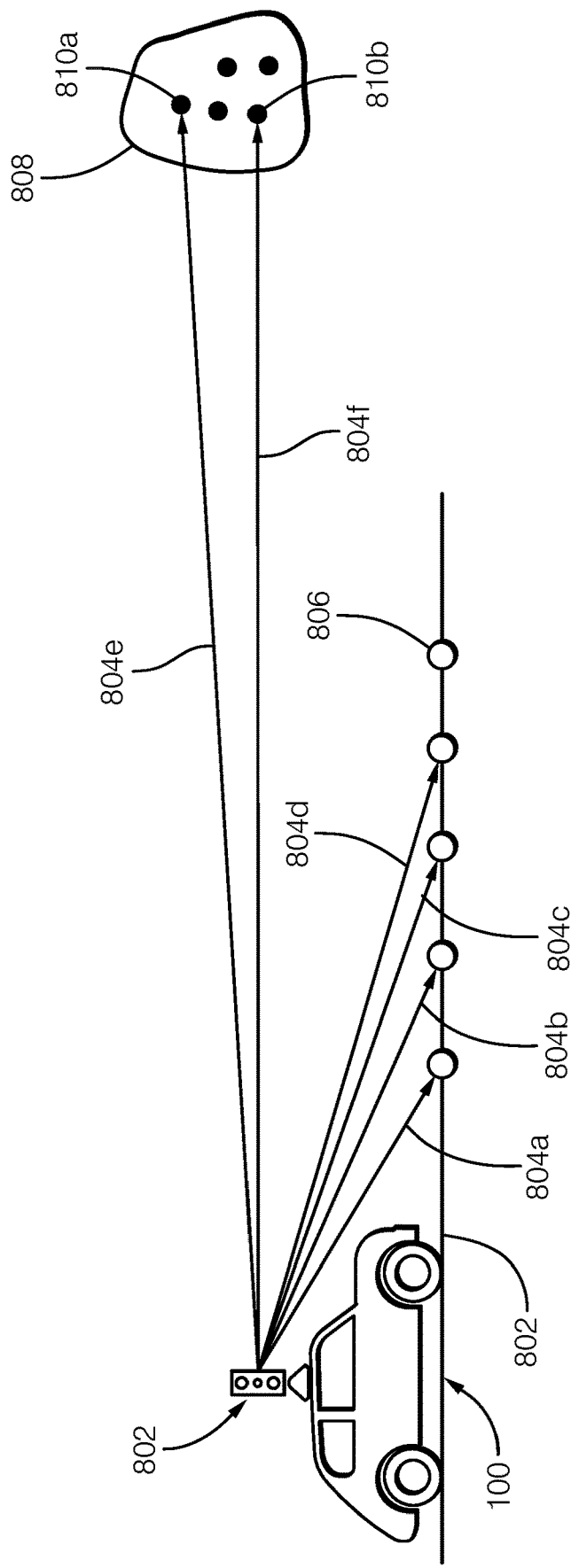
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
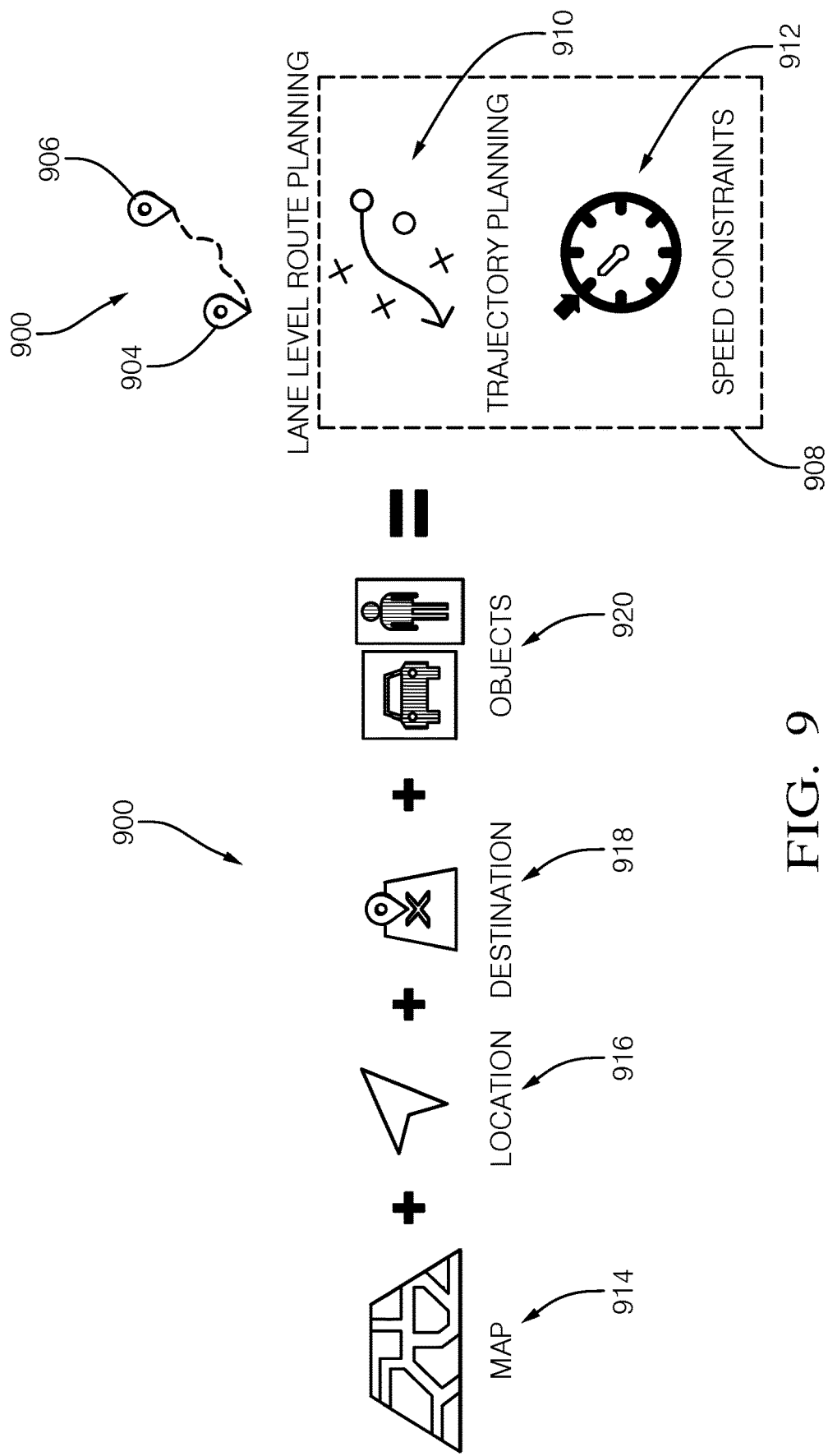
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
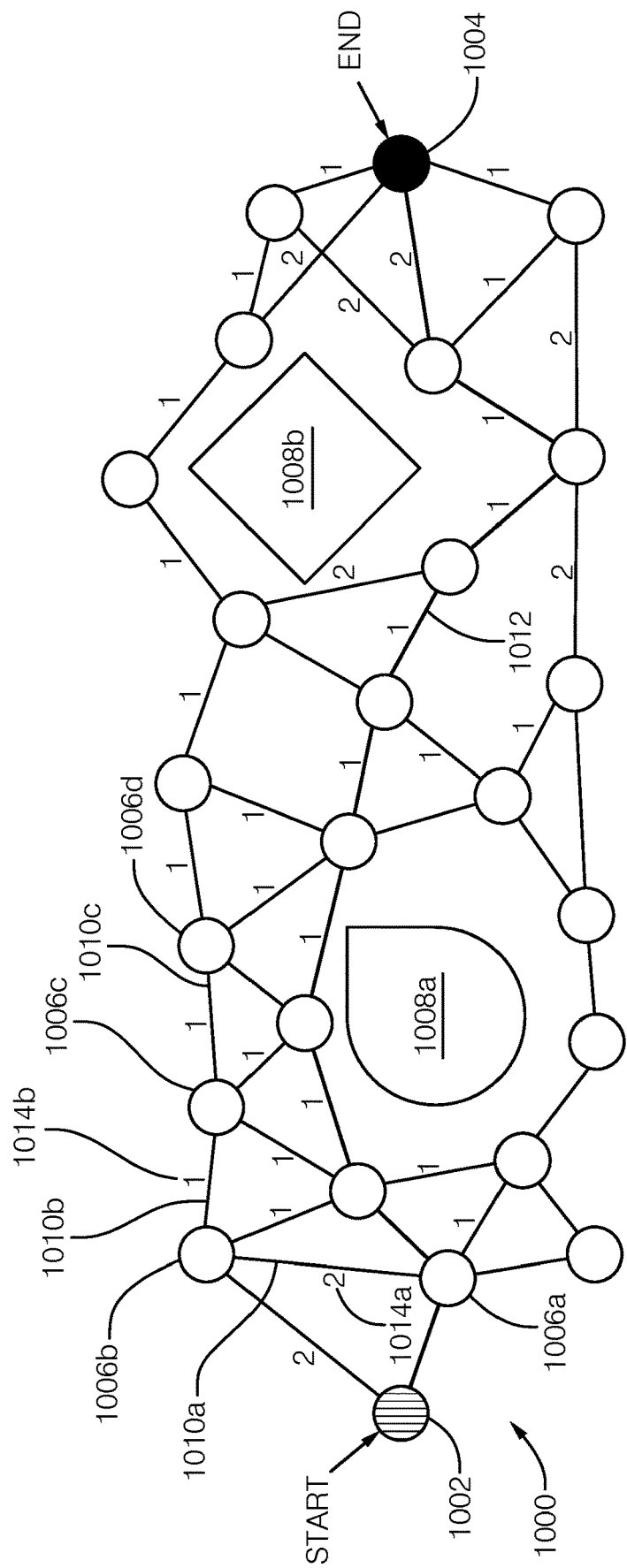
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
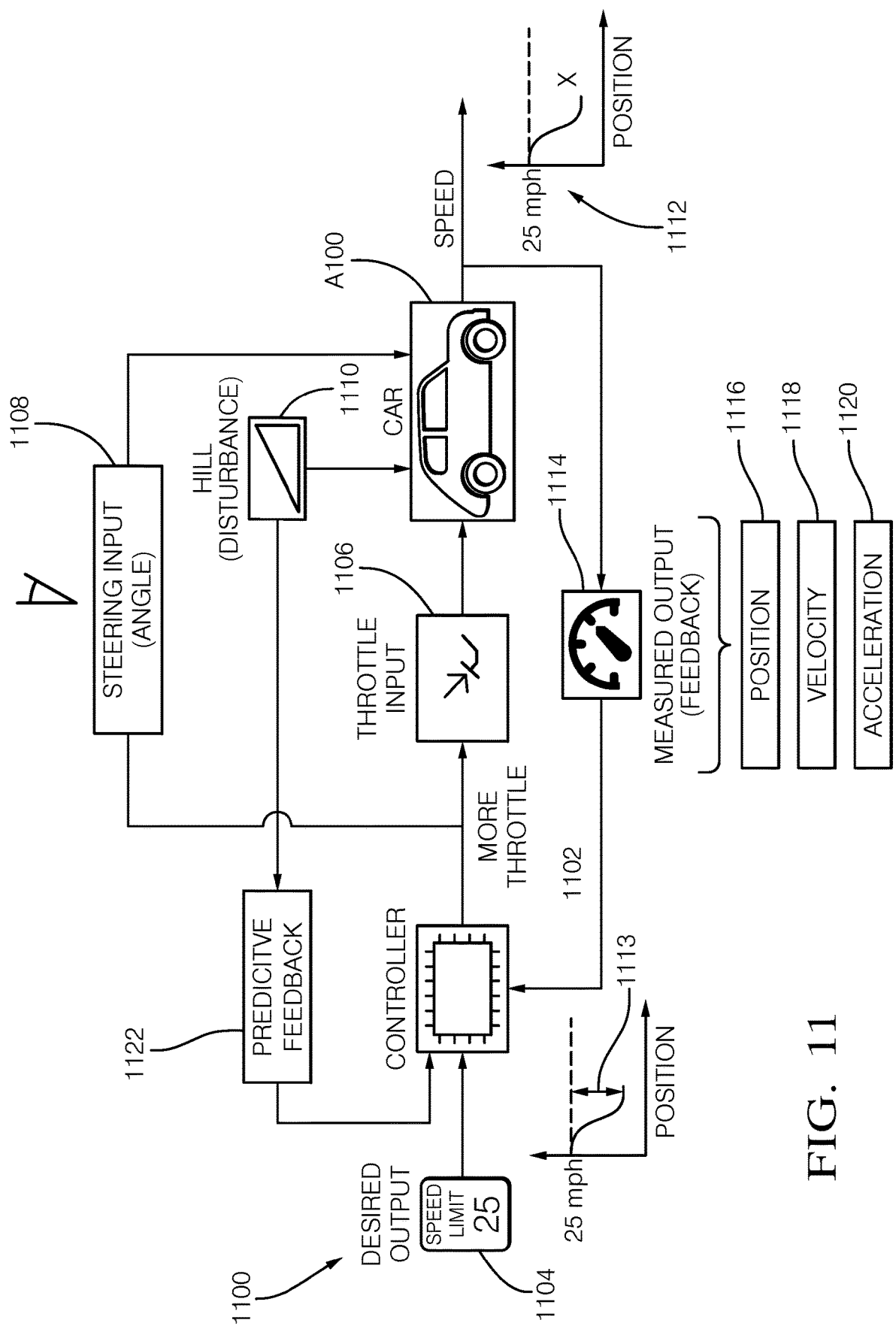
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
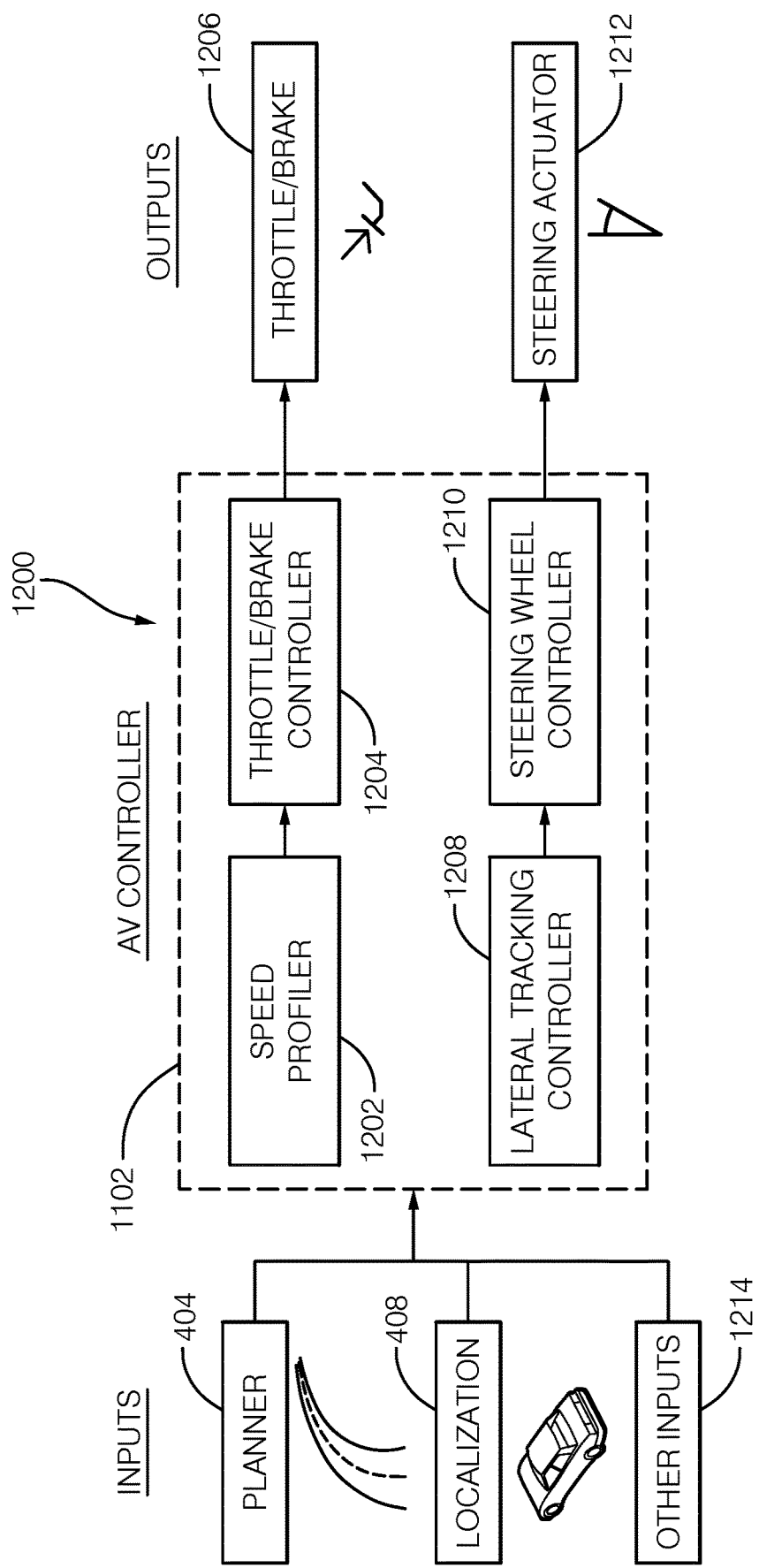
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Object Indicator Module System and Method

Figure 13:
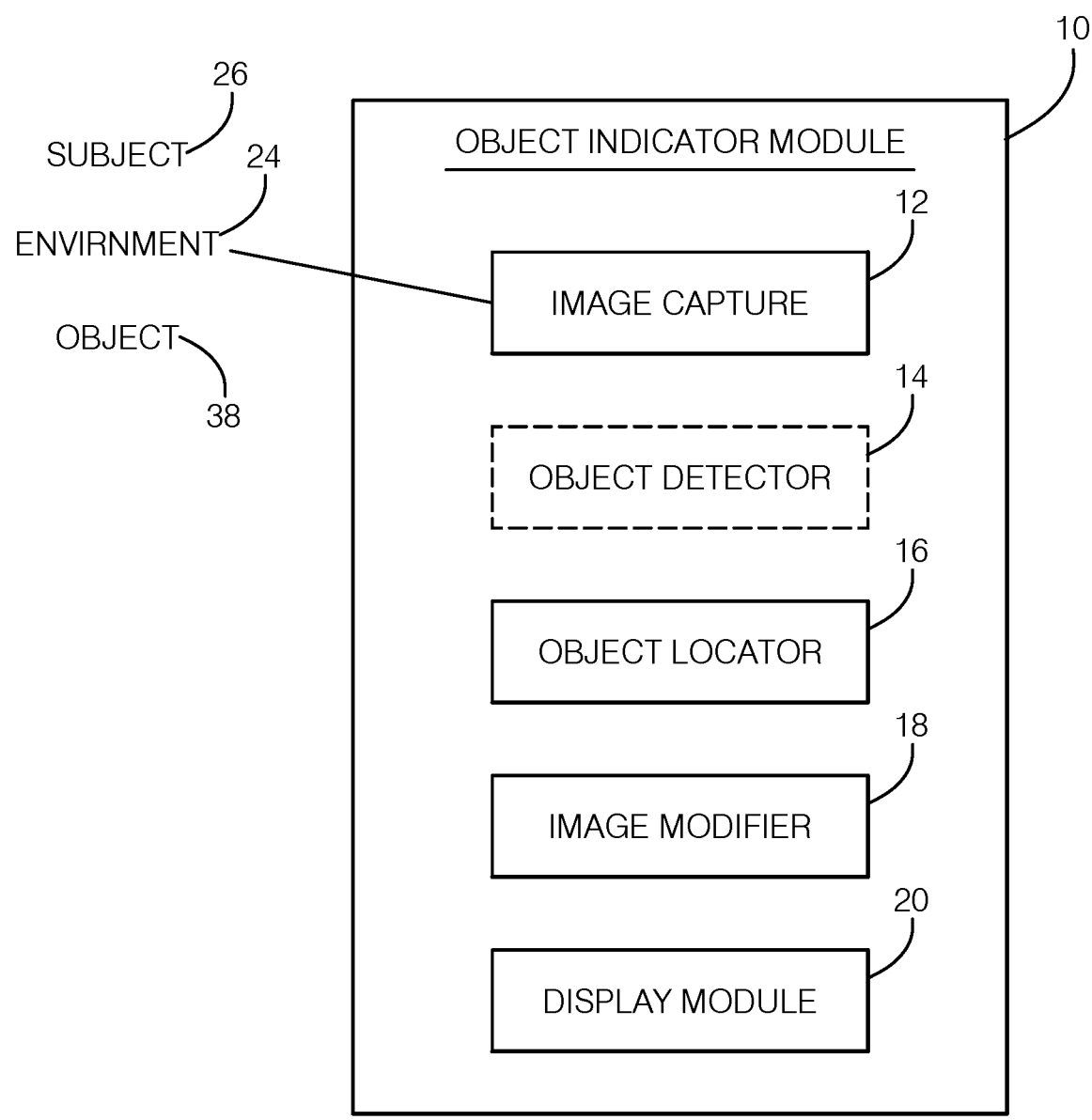
FIG. 13 shows an object indicator module.

FIG. 13 shows one non-limiting example of an object indicator module 10 that causes a modified image to be displayed. A potential passenger or client of a transportation service views the modified image to determine the location of, for example, a transportation vehicle or a transportation site. Known ride-sharing applications such as Uber and Lyft provide a representation of a map as an indication of a current location of a transportation vehicle. Some people may have difficulty orienting themselves to understand where the location of the transportation vehicle is based on an indication from a map. This disclosure describes techniques for improving a user's experience when using a service such as a ride sharing application, for example by providing a user with location information that is readily associable with the user's environment. According to the various techniques describe herein, a subject user is provided location information by modifying a captured still or video image of a user's environment, and modifying that captured image with at least one indication of a location of an object, such as an approaching transport vehicle.

The object indicator module 10 modifies the captured image to provide a modified image that indicates the location of an object 38 (e.g. an approaching transportation vehicle) relative to the environment 24. The captured image and the modified image each show at least a portion of an environment 24 (i.e. surroundings) of a client. The captured image and the modified image may show the same portion or different portions of the environment. The portions may overlap partially, or one may be a subset of the other, or there may be no overlap. The object indicator module 10 receives the captured image. The captured image may be in the form of a single still image, a series or sequence of still images, or a video. The object indicator module 10 may output or provide the modified image in one or more of several forms such as in the form of a single still image, a series or sequence of still images, or a video. The captured image and the modified image may have the same or different forms. For example, the captured image may be a video, and the modified image may be a single still image.

The object indicator module 10 causes a modified image to be presented that preferably shows a perspective of the environment 24 proximate to the client that corresponds to the client's own perspective of the environment 24. That is, rather than showing the client a top-down view or birds-eye view of the environment 24 as a map would do, the modified image advantageously shows a perspective of the environment 24 that is like that seen by the eyes of the client directly viewing the environment 24. As such, the client can readily understand which portion of the environment 24 of the client is depicted in the modified image.

A recently captured image shows various objects (e.g. buildings, vehicles, other people) that the person can also see directly with their own eyes in front of them while on the street. As such, the person can readily understand which portion of their environment 24 is depicted in an image. The object indicator module 10 modifies the captured image to provide a modified image that indicates the location of an object 38 (e.g. an approaching transportation vehicle) relative to the environment 24. The object indicator module 10 may depict the object 38 within the modified image, or indicate a position of the object 38 relative to boundaries of the modified image. As used herein, the term "modified image" refers to an image or a video that is based on a recently captured image. The object indicator module 10 receives a recently captured image taken or captured within the previous few seconds, preferably within the previous minute. As such, the modified image is not solely based on images taken a relatively long time ago, e.g. more than an hour ago.

Because the modified image is based on a recently captured image, the modified image includes at least some transient objects present in the environment 24. As used herein, "transient objects" are instances of objects in an environment that are not permanent. Transient objects are those objects whose locations are likely to change in less than an hour. Examples of transient objects include pedestrians and moving vehicles. In one example, the modified image shows the approaching transportation vehicle. In this example, the approaching transportation vehicle is a transient object. The modified image also includes relatively permanent objects whose locations are likely to remain fixed for greater than an hour. Examples of relatively permanent object include buildings, traffic signals, and street signs. In one example, the modified image shows a transportation site where the client can go to board the approaching vehicle. In this example, the transportation site vehicle is a permanent object.

The object indicator module 10 applies modifications to the captured image to indicate the location of the object 38 relative to the environment 24. By modifying the captured image, the object indicator module 10 conveys object location information to a client (i.e. a potential passenger) of a transportation vehicle or transportation service. As used herein, the term "object" is associated with one or more instances of objects associated with providing a client with one or more transportation options. For example, the term object may refer to a transport vehicle that has been dispatched to provide the client with transportation, or a location where the client can board transportation, e.g. at a transportation site or a transportation site. As specific non-limiting examples, the object 38 may include an automated mobility on demand (AMOD) vehicle, a human operated transport vehicle utilizing a ride-sharing mobile application such as Uber or Lyft, or a transportation site that the client can access for transportation.

The object indicator module 10 may also apply modifications to the captured image to indicate the location of a subject 26 relative to the environment 24. In one example the subject 26 is the client of the transportation vehicle (the object 38). If the modified image indicates the locations of both the client (the subject 26) and the approaching transportation vehicle (the object 38), the client more readily understands the location of the object 38 with respect to the environment 24. In another example the subject 26 is a transportation site (e.g. a taxi stand or bus stop) where the client can go to board a transportation vehicle (the object 38). In some examples a transportation site is the subject 26, and in other examples a transportation site is the object 38. For example, if the client is waiting in a restaurant (likely out of view of any captured images) for the transportation vehicle to arrive at a transportation site nearby the restaurant, then the transportation site is the subject 26. However, if the client is trying to find his/her way to the transportation site, then the transportation site is the object 38.

The object indicator module 10 applies modifications to the captured image to provide the modified image. The modifications are configured to draw the attention of the eye(s) of the client(s) to depictions and/or indications of the object 38 and/or the subject 26. Non-limiting examples of the modifications include highlighting or visually enhancing areas of the modified images and/or adding symbols to indicate the position of the object 38 within, or relative to, the modified image, thereby indicating the location of the object relative to the environment. If the object 38 is present in the modified image, the location of the object 38 is, for example, indicated by highlighting or visually enhancing the depiction of the object 38. If the object 38 is located outside of the boundaries of the modified image, the location of the object 38 is, for example, indicated by an arrow pointing towards the object 38. More details regarding the modifications are presented later in this description.

The object indicator module 10 may also cause a sound to be emitted that indicates the proximity (e.g. distance and/or direction) of an approaching transportation vehicle. Persons with vision impairments may find the sound preferable to the modified image for estimating an arrival time of a transportation vehicle. The emitted sound corresponds to the modified image. In one example, the emitted sound is a series of beeps. The repetition rate and/or tone (i.e. frequency) of the beeps may vary as the distance between the subject 26 and the object 38 changes. As a non-limiting example the repetition rate may be one beep per second when the approaching vehicle is more than one kilometer away, and the repetition rate linearly ramps as the approaching vehicle gets closer to ten beeps per second when the approaching vehicle is less than ten meters away.

The object indicator module 10 as described herein comprises a plurality of individual modules 12, 14, 16, 18, 20 that each perform respective functions or functionality associated with operation of the object indicator module 10. Each of the respective modules described herein may be implemented via hardware, software, firmware, and the like, or any combination thereof. In cases where the described modules are implemented in software and/or firmware, the respective modules described herein may comprise program instructions stored in a tangible medium (e.g., short term memory, long term storage, and the like) and executable by one or more processors to implement the functionality described herein. According to examples where respective modules of the object indicator module 10 are implemented in software, the respective modules may comprise separate instructions which may be executed by a single processor device, or multiple discrete processor devices, which may reside in a single location (e.g., within the electrical system of a transport vehicle), or multiple distributed locations communicatively coupled to one another via a network. FIGS. 1 through 12, and the associated descriptions of those figures provided above, are non-limiting examples of how to implement operation of such the object indicator module 10.

The object indicator module 10 includes an image capture module 12. In one example, the image capture module 12 receives at least one captured image. The image capture module 12 may receive any variety of captured images, including one or more still images. For example, the image capture module 12 may receive a single snapshot or a burst, e.g. a sequence of multiple snapshots. In other examples, the image capture module 12 may receive a captured image that is a video image. In other examples, the image capture module 12 may receive a return map from a radar unit. The radar unit uses radio waves to determine the return map. The return map indicates distance and direction to one or more objects in the field of view of the radar unit. In other examples, the image capture module 12 may receive a point cloud from a lidar unit. The lidar unit uses light beams to determine the point cloud. The point cloud indicates distance and direction to one or more objects in the field of view of the lidar unit. In other examples, the image capture module 12 receives from a camera captured images augmented or annotated with distance data from a radar-unit or a lidar-unit. In other examples, the image capture module 12 may receive a time stamp that indicates the moment that the captured image is taken.

The image capture module 12 receives the captured image from one or more devices such as a camera, a radar unit, a lidar unit, or any combination thereof. Previously described examples includes sensors (121), camera (122, 502c), LiDAR (123, 502a) and/or radar (502b) shown in FIGS. 1, 4, and 5. In some examples, the devices operate independently. That is, the image capture module 12 does not determine or control the devices settings and/or the instant in time that the captured image is taken and/or sent to the image capture module 12. In other examples, the image capture module 12 may output one or more control signals that determine or influence the operation of the cameras, radar units and/or lidar units that contribute information to the captured image. For example, the image capture module 12 may output one or more control signals that specify the instant at which the captured image is taken. In other examples, the image capture module 12 outputs one or more control signals that specify one or more device settings. For example, one or more control signals may specify one or more of a camera lens setting (e.g. wide angle vs. telephoto), a direction to aim a camera, a maximum range limit setting of a radar unit, or light beam scan area of a lidar unit.

The image capture module 12 receives one or more captured images that cover or include at least a portion of an environment 24 of a subject 26. In some situations, it is unnecessary for the modified image to depict the entire environment, i.e. a 360-degree image. For example, it may be unnecessary for the modified image to depict a building behind the client. In such situations, it follows that it is unnecessary for one or more of the captured images to cover the entire environment. Furthermore, the size of the portion may be limited by the field of view capabilities of the devices (camera, radar unit, and/or lidar unit) used to take the captured image. The image capture module 12 may combine multiple images from multiple devices if a larger portion is desired than is available from a single device or single image. In one example, the image capture module 12 combines multiple images to provide a captured image that covers the entirety of the environment 24. In this example, the captured image has a 360-degree field of view. In another example the image capture module 12 receives the captured image from a single camera, which may have a limited angular field of view, e.g. a 90-degree field of view. In this example, the portion of the environment covered by the captured image is equal to or less than 90 degrees, i.e. one quarter of the environment 24. Other values of field of view are possible and may be desirable depending on, for example, the relative position of the subject 26 and the object 38

The image capture module 12 receives captured images from one or more devices, e.g. one or more cameras, one or more radar units, and/or one or more lidar units. Previously described examples includes sensors (121), camera (122, 502c), LiDAR (123, 502a) and/or radar (502b) shown in FIGS. 1, 4, and 5. The devices may be located anywhere in the environment 24. Some or all the devices may have fixed locations. Examples of devices with fixed locations include traffic cameras, security cameras, and security system motion sensors. Likewise, some or all the devices may be mobile. Examples of mobile devices include vehicle perception sensors, cell phone cameras, and drone mounted cameras. A perception sensor may include, but is not limited to, one or more vehicle mounted cameras, radar units and/or lidar units, as will be recognized by those in the automated vehicle arts. In one example, the subject 26 is a pedestrian, the environment 24 is the area around the pedestrian, and the captured image 22 is a snapshot captured by a camera of a phone operated by the pedestrian. In another example, the subject 26 is a transportation site where a pedestrian can go for transportation, e.g. catch a taxi, and the captured image 22 is a video from a camera positioned to view the transportation site and nearby vehicles. In yet another example, the captured image 22 is a combination of images from the camera of the phone, the camera at the transportation site and a perception sensor mounted on an approaching vehicle.

The object indicator module 10 includes an object detector module 14. The object detector module 14 operates to identify objects in the one or more captured images. The object indicator module 10 uses the identification of an object to determine which objects in the modified image are to be highlighted or otherwise indicated. The object detector module 14 identifies the objects using known image processing and analysis techniques. Examples of identifications determined by the object detector module 14 include a pedestrian, a vehicle (e.g. car, bus, train), a building or landmark. In one example, the object detector module 14 identifies the approaching vehicle as a vehicle, identifies the transportation site as a landmark or building, and identifies the pedestrian who electronically hailed transportation as a pedestrian.

The object indicator module 10 includes an object locator module 16. The object locator module 16 operates to determine a location of an object 38. In some examples, the object locator module 16 determines a location of an object that is a transport vehicle. Examples of transport vehicles that the object locator module 16 may determine a location for may include a taxi, a vehicle associated with a ride sharing application, or any other vehicle, including autonomous vehicles, semi-autonomous vehicles, and the like as described in reference to FIGS. 1 and 4. In other examples, the object locator module 16 determines location of an object that is a transportation site, such as a defined ride sharing pickup area, a taxi stand, or the like. In one example, the object 38 is the approaching vehicle and the subject 26 is the pedestrian who may have electronically hailed transportation, i.e. called for or otherwise requested transportation. In another example, the object 38 is the transportation site and subject 26 is the pedestrian, so the location indicates where to find the transportation site. In yet another example, the object 38 is the approaching vehicle and subject 26 is the transportation site. In this example, the pedestrian who is seeking transportation at the transportation site may be waiting in a nearby business, e.g. a restaurant.

The location of the object 38 and/or the subject 26 may be represented by, for example, global position system (GPS) coordinates from a global navigation satellite system (GNSS) receiver, or a relative position (e.g. distance and direction) with respect to the subject 26. If the object 38 is the approaching vehicle, the GPS coordinates of the approaching vehicle may be broadcast. If the approaching vehicle is an autonomous vehicle (e.g. driverless vehicle), dedicated short range communications (DSRC) such as vehicle-to-everything (V2X) or vehicle-to-infrastructure (V2I) communications, or cellular communications such as cellular-vehicle-to-everything (C-V2X) may broadcast the GPS coordinates. If the approaching vehicle is human operated, a smart phone carried/operated by the human operating the vehicle may broadcast the GPS coordinates. In this example, the object locator module 16 receives those broadcast GPS coordinates. In another example, the object locator module 16 determines the GPS coordinates of the object 38 based on distance and direction from an infrastructure device, e.g. a camera, radar unit, lidar unit, or any combination thereof. The object locator module 16 determines the GPS coordinates of the object based on distance and direction information the infrastructure device in combination with known GPS coordinates of the infrastructure device. In another example, the distance and direction to an approaching vehicle (the object 38) from a pedestrian (the subject 26) is determined from a captured image taken using a phone camera operated by the pedestrian. The object locator module 16 uses that distance and direction information in combination with GPS coordinates of the phone to determine the location (i.e. GPS coordinates) of the object 38.

The object indicator module 10 includes an image modifier module 18. The image modifier module 18 determines modifications of the captured image to generate a modified image. The image modifier module 18 determines modifications of the captured image in response to determining the location of the object 38. The modified image indicates the location of the object 38 (i.e. the depiction of the object 38 in the modified image) relative to the environment 24. The image modifier module 18 indicates the location of the displayed object by modifying the captured image. The image modifier module 18 modifies the captured image so a person viewing the modified image can readily detect the displayed object and/or a displayed subject in the modified image.

According to a typical ride-share application, once a client has "hailed" a transport vehicle to their location, the user (client) is provided with a graphical indication of a map that includes an indication of a current location of a transport vehicle. The map may further indicate an estimated arrival time of the transport vehicle, based on current traffic conditions, distance to travel, and other factors. While such a ride-share app does provide a user with a relatively vague indication of a location of a transport vehicle, it is often challenging for the subject user to effectively correlate the map-based location with the subject user's location in their physical surroundings. Although the map interface indicates roughly where the transport vehicle is, it is typically not clear to a user where along a street, or on what side of the street, pickup is expected. In many cases, such a map-based interface causes unnecessary delays due to the need of the transport vehicle driver and subject client to communicate with one another to identify an appropriate location, or even for the subject client to find in their surroundings a location if identified.

This disclosure is directed to techniques for improving the provision of ride sharing services to subject clients, by providing the subject client with an indication superimposed or rendered into an image that the client can readily correlate with their surroundings. According to these techniques, instead of providing a client with a rough, general location of a transport vehicle on a map, instead, the client is provided with an indication that the user can correlate easily with what the client can see. By doing so, a client can easily recognize a landmark or other feature in their environment, and easily recognize where to meet a transport vehicle for pickup. In this manner, a subject client's experience with the rideshare app may be simpler, and more efficient than typical ride sharing applications as described above.

In one example, the image modifier module 18 highlights the displayed object (and/or the displayed subject) by adjusting the color of the displayed object. For example, the displayed object may be colored red or green or a color that contrasts with (i.e. is different from) the surroundings of the displayed object, i.e. the background of the modified image. In other examples, the image modifier module 18 depicts the displayed object in color, and depicts the surroundings or background in grey scale. In other examples, the image modifier module 18 changes the contrast of the modified image so the displayed object is more apparent, e.g. the depicts displayed object in high contrast, and depicts the surrounding area in low contrast. In yet another example, the image modifier module 18 depicts the displayed object in-focus and the surrounding area out-of-focus. The image modifier module 18 may cycle any of these modifications. For example, the image modifier module may alternate the coloring of the object between red and green, or alternate the background between in-focus and out-of-focus.

In yet another example, the image modifier module 18 overlays the displayed object with semi-transparent colored shape or (i.e. graphic overlay), e.g. a circle or a square. The shape may be a filled shape or a colored outline of the shape. In another example, the image modifier module 18 adds an arrow in the modified image. For example, if the approaching vehicle is outside the boundaries of the modified image, the arrow points towards the boundary at a point where the approaching-vehicle would likely enter the modified image. If the approaching-vehicle is within the boundaries of the modified image, the arrow points at the approaching vehicle 36, hereafter sometimes referred to as the vehicle 36. The image modifier module 18 may add arrows that point at or toward any instance of the subject 26 or the object 38 depicted in the modified image 44A. In another example, the image modifier module 18 adds an indicator indicative of the distance between the subject 26 and the object 38 or the distance between the boundary of the modified image and the object 38. In another example, the indicator may indicate an estimated time of arrival (ETA) for approaching vehicle to arrive at, for example, the transportation site and/or a compass indicator/heading of the direction from the subject 26 to the object 38.

The object indicator module 10 includes a display module 20. The display module 20 causes the modified image to be presented on at least one display. The display module 20 may communicate with the display by way of, for example, an internet connection, or other known wired and wireless communications means. In one example, the display is a smart phone carried by the client. In other examples, the display is a monitor located at the transportation site or inside a building proximate to the transportation site. In one example, the display module 20 communicates (e.g. transmits) the modified image to the display. In this example, the modified image sent includes all of modifications applied by the image modifier module 18, and the selected portions of the one or more captured images. In another example, the display module 20 communicates only the modifications that are to be applied to the captured image, rather than the complete modified image. In this example, the display or other intervening equipment adds or applies the modifications to the captured image to generate the modified image. For example, the modifications may merely specify the size, shape and X-Y coordinates on the captured image where a highlight is to be added or applied to the captured image, or X-Y coordinates on the captured image where other previously mentioned techniques of image modification are to be applied. Having the display module 20 send only the modifications rather than the complete modified image may be advantageous when communication bandwidth is too limited to quickly communicate the complete modified image. Having the display module 20 send only the modifications may be particular advantageous for the example situation where the captured image is taken by a camera of a smart phone, and the modified image is displayed on the display of that smart phone because the amount of data transmitted is reduced.

Figure 14:
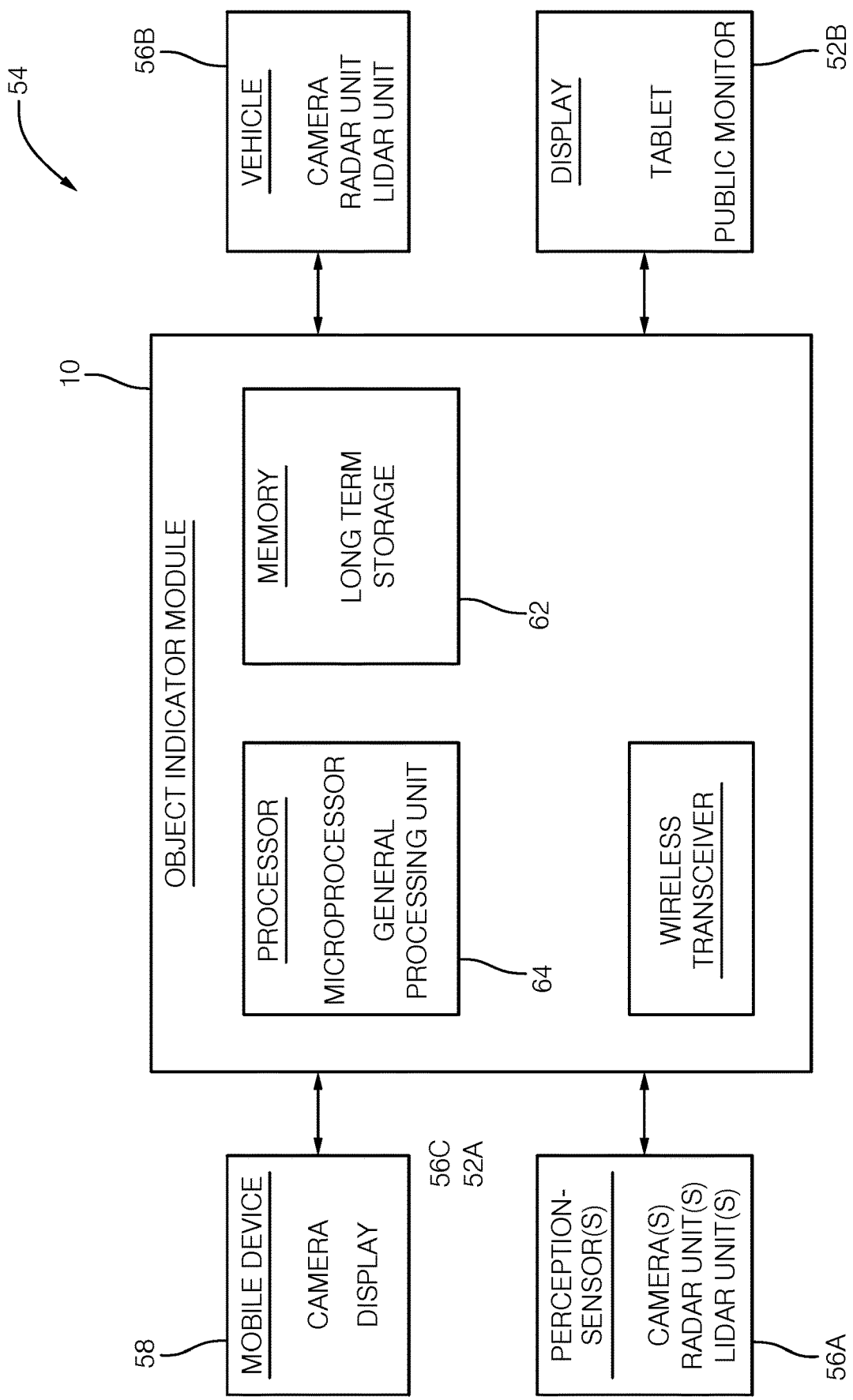
FIG. 14 shows a system that includes an object indicator module.

FIG. 14 illustrates one non-limiting example of a system 54 that includes the object indicator module 10, and various devices 52, 56A, 56B, 56C, 58 in communication with the object indicator module 10. The object indicator module 10 communicates with the devices 52, 56A, 56B, 56C, 58 by way of, for example, wires, optical cable, or wireless communications. The object indicator module 10 may include a wireless transceiver to enable wireless communications. The system 54 includes one or more perception sensors 56A, 56B in communication with the object indicator module 10. The perception sensors 56A, 56B are comparable to sensors 121 shown in FIGS. 1 and 4. Examples of the perception sensors 56A include infrastructure cameras, radars, and/or lidars used for traffic-control, security, and/or crowd detection. Examples of the perception sensors 56B include one or more cameras, radar units and/or lidar units commonly found on vehicles for vehicle safety systems and/or autonomous driving systems. Any one or combination of cameras, radars, and/or lidars described herein may provide the captured image.

In one example, an instance of camera 56C and a display 52A are part of a mobile device 58. Non-limiting examples of the mobile device 58 include a smart phone or a tablet operated by a potential client, or a wearable device (e.g. smartwatch, augmented reality glasses) worn by the potential client. In this example, the object indicator module 10 receives an image taken by the camera 56C. All or part of the captured image comes from the camera 56C, i.e. the mobile device 58. If the mobile device is operated by a client, then the client can readily comprehend the orientation/perspective of the modified image when viewed on the display 52A. As such, the client can more easily understand where the object 38 is located, even if object is out-of-frame, i.e. outside the boundaries of the modified image. In some examples, the object indicator module 10 updates the modified image.

In one example, the object indicator module 10 updates the modified image in a periodic basis. One suitable update rate is once per second, but other update rates may be preferred in certain situations. In another example, the object indicator module 10 updates the modified image in response to a determination that the mobile device 58 has moved. The object indicator module 10 may determine that the mobile device has moved based on changes in the captured image from the camera 56C. If the approaching vehicle or the transportation site (the object 38) that the client seeks is out-of-frame, the indicator of the location of the object updates will aid the client in pointing the camera 56C towards the object. That is, the person can pan the camera 56C so the object 38 appears in the captured image and thereby can appear in the modified image. In this example the update rate may be faster, e.g. once per two hundred milliseconds, or dependent on how fast the client pans the camera 56C.

In another example, the object indicator module 10 causes the modified image to be displayed on a dedicated display such as a tablet or public monitor. The dedicated display may be located remote from where the client is to board the transport vehicle. This would allow the client to remain inside a building until the transport vehicle as arrived or is very close, e.g. five seconds away.

In some examples the object indicator module 10 includes a memory 62 and a processor 64. The memory 62 is similar to data storage unit 142 and/or memory 144 described in relation to FIG. 1 and/or similar to the ROM 308 and/or the storage device 310 described in relation to FIG. 3. The processor 64 is similar to the computer processors 146 described in relation to FIG. 1 and the processor 304 described in relation to FIG. 3.

Figure 15:
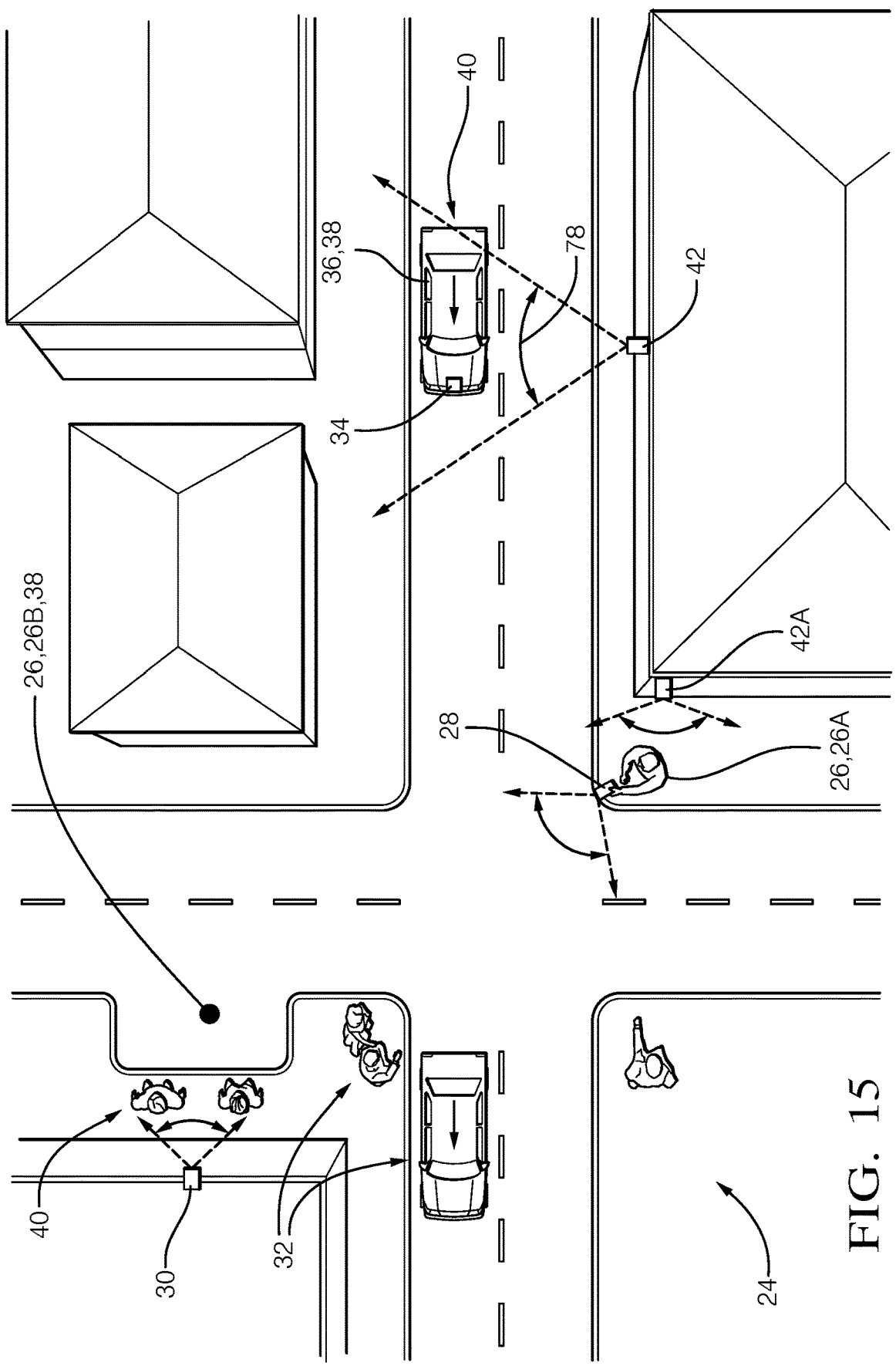
FIG. 15 shows a top-view of an environment of a subject.

FIG. 15 shows a non-limiting example of an environment 24 of a subject 26. In a first scenario, the subject 26 is a pedestrian 26A, e.g. a client, and the object 38 is an approaching vehicle 36. The pedestrian 26A engages (i.e. makes use of, e.g. starts a transportation service app on the phone 28) the object indicator module 10 to electronically hail (i.e. request or order) transportation. In one example, the object indicator module 10 instructs the pedestrian 26A (via the transportation service app on the phone 28) to aim the camera of the phone 28 so the camera has a view of the environment 24 to take the captured image 22. If the object detector module 14 is unable to detect one or more permanent objects, the object indicator module 10 may instruct the pedestrian 26A to move the phone 28 to a different position (e.g. hold the phone 28 higher, or move closer to the curb) so the field of view of the camera is not obstructed by, for example, transient objects such as pedestrians or a bus.

In one example, in response to that hail, the approaching vehicle is caused to travel toward the pedestrian 26A. Alternatively, the pedestrian 26A may be simply searching for any form of nearby transportation, and the approaching vehicle 36 is coincidently headed toward the pedestrian 26A. In either case, for this example scenario, the pedestrian 26A engages the object indicator module 10 (i.e. using a transportation service app) to determine and indicate a location 40 of the approaching vehicle 36. The object indicator module 10 indicates the location 40 of the approaching vehicle (the object 38 in this example) by presenting a modified image to the pedestrian 26A that is based on the captured image 22. Details of how the captured image 44 is modified to indicate the location 40 are provided elsewhere in this disclosure.

In a second scenario, the subject 26 is the pedestrian 26A, and the object 38 is the transportation site 26B. The pedestrian 26A engages the object indicator module 10 to determine the location 40 of the transportation site 26B. Similar to the first scenario described above, the object indicator module 10 indicates the location 40 of the transportation site 26B (the object 38 in this example) by presenting a modified image to the pedestrian 26A that is based on the captured image 22. In a third scenario, the subject 26 is the transportation site 26B, and the object 38 is the approaching vehicle 36. The pedestrian 26A may be waiting for transportation inside the building adjacent to the transportation site 26B, and the camera 30 on that building monitors the transportation site 26B and detects when the approaching vehicle 36 arrives at the transportation site 26B. Numerous other scenarios are possible.

Figure 16A:
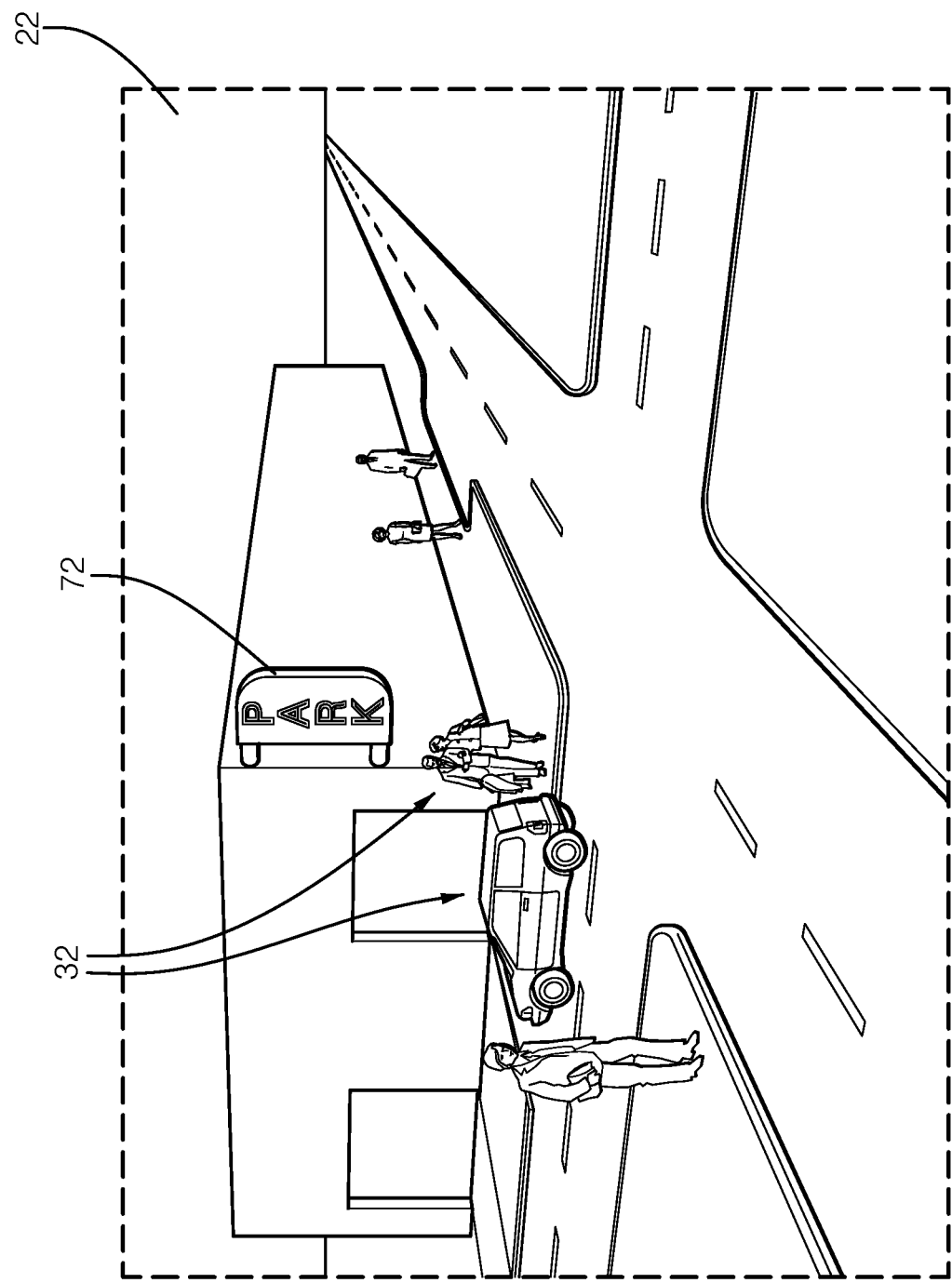
FIG. 16A shows an image of a portion of the environment.

FIG. 16A illustrates a non-limiting example of a captured image 22 that covers or shows a portion of the environment 24 of the subject 26. This example of the captured image 22 may be from a camera in the phone 28 held by the pedestrian 26A as depicted in FIG. 15. The phone 28 is similar to the camera 56C of the mobile device 58 described in relation to FIG. 14. The captured image 22 shows transient objects 32 such as pedestrians and a car. The transient objects 32 will likely moved and may not be present in a subsequent captured image. The captured image 22 also shows relatively permanent objects or landmarks such as a parking facility 72. The object indicator module 10 receives the captured image 22, and provides a modified image based on the captured image 22.

Figure 16B:
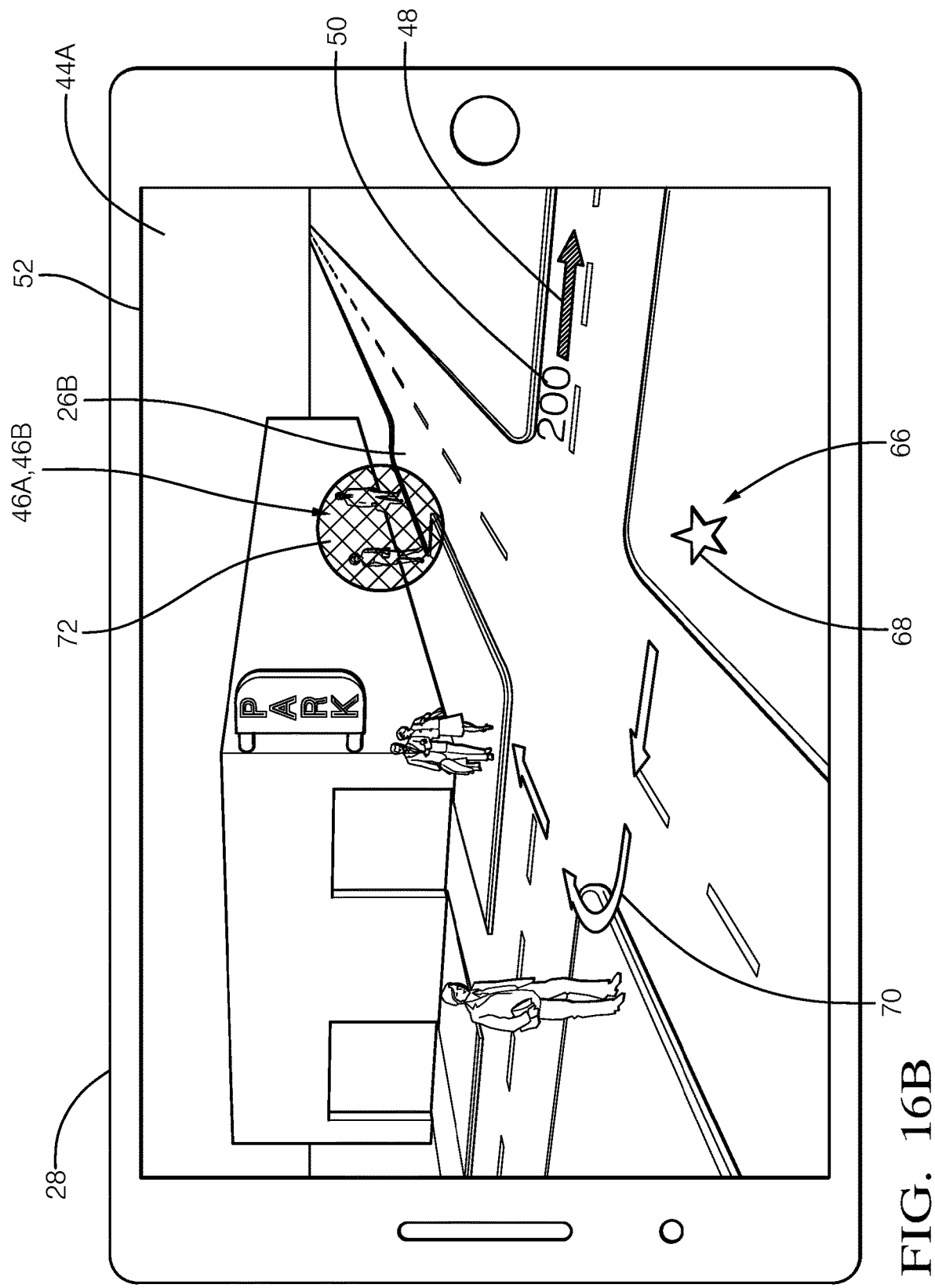
FIG. 16B shows a modification of the captured image of FIG. 16A displayed on a smart phone.

FIG. 16B shows a non-limiting example of a modified image 44A. The modified image 44A is a modification of the captured image 22 of FIG. 16A. In this example, the modified image 44A shows approximately the same field as the captured image 22. The object indicator module 10 (i.e. the image modifier module 18) may alter the field of view of the modified image 44A. For example, if a distance to the transportation site 26B is greater than a threshold value, the object indicator module 10 may reduce the field of view of the modified image 44A so the transportation site 26B appears lager in the modified image 44A. As another example, if the number of permanent objects in the modified image 44A is less than a threshold value (e.g. 2), or there is a prominent landmark (e.g. a statue) just outside the field of view of the captured image 22, the object indicator module 10 may increase or widen the field of view of the modified image 44A so the client can more easily orient themselves. The object indicator module 10 may gather additional image information for the modified image with the widened field of view from, for example, Google maps.

The object indicator module 10 (i.e. the display module 20) causes the modified image 44A to be displayed on a display 52 of the phone 28. The modified image 44A of FIG. 16B shows several modifications 48, 50, 68, 70, 74 applied to the captured image 22 to produce the modified image 44A. Not all the modifications are always necessary or always shown. That is, a modified image will normally show only some (e.g. one or two) of the modifications shown in FIG. 16B. FIG. 16B shows all the modifications only for the purpose of discussion and to reduce the number of drawings. Various examples of which modifications would be shown in various situations will now be discussed.

In one example, the object indicator module 10 provides a version of the modified image 44A that only shows the arrow 48. The arrow 48 may also be referred to as a compass indicator 48. This may be sufficient information for the pedestrian 26A to understand where to look for the approaching vehicle 36 (the object 38 for this example) and/or which direction to pan the camera of the phone 28. In another example, the object indicator module 10 provides a version of the modified image 44A that includes a distance indicator 50 indicates how far away (in meters) is the approaching vehicle 36. Alternatively, the numerical value of the distance indicator 50 indicates an estimated time of arrival (ETA, in seconds and/or minutes) of the approaching vehicle 36.

In another example, the object indicator module 10 provides a version of the modified image 44A that shows only the highlight 74 overlaying a displayed object 46A, i.e. a depiction of the object 38 in the modified image 44A. For this example, the object 38 is the transportation site 26B. The highlight 74 may be any of the previously mentioned ways to draw the eyes of the pedestrian 26A to something in the display 52. Examples of the highlight 74 include, but are not limited to, shading the area of the highlight 74 a distinctive color, e.g. red or green, or altering the contrast of the area of the highlight 74.

In another example, the object indicator module 10 provides a version of the modified image 44A that includes a suggested path 70 for the pedestrian 26A to follow to the transportation site 26B. If the transportation site 26B is hidden from view, e.g. the transportation site is behind the parking facility, the object indicator module 10 provides a version of the modified image 44A that only shows the suggested path 70.

In any of the above examples, the object indicator module 10 may add to the modified image 44A a symbol 68 indicative of a position 66 of the subject 26. When the captured image 22 comes from the camera of the phone 28, the pedestrian 26A may not be depicted in the captured image. For the example of the modified image 44A shown in FIG. 16B, the subject 26 is the pedestrian 26A. The object indicator module 10 may provide a version of the modified image 44A that includes the symbol 68. The position of the symbol 68 in the modified image 44A indicates the position 66 of the person in the environment 24. The modified image 44A may be expanded (zoomed), pinched, or scrolled in the same manner pictures are manipulated on a smart phone. The presence of the symbol 68 may help the user to manipulate the image to better understand the location of the object 38 in the environment 24

Some examples of the phone 28 have cameras on opposite sides of the phone 28. As such, the captured image 22 could include the pedestrian 26A if the object indicator module 10 receives images from both cameras of the phone 28. When this is the case, images from both cameras of the phone 28 may be combined so the pedestrian 26A is depicted in the modified image 44A rather than being indicated by an instance of the symbol 68.

Figure 17A:
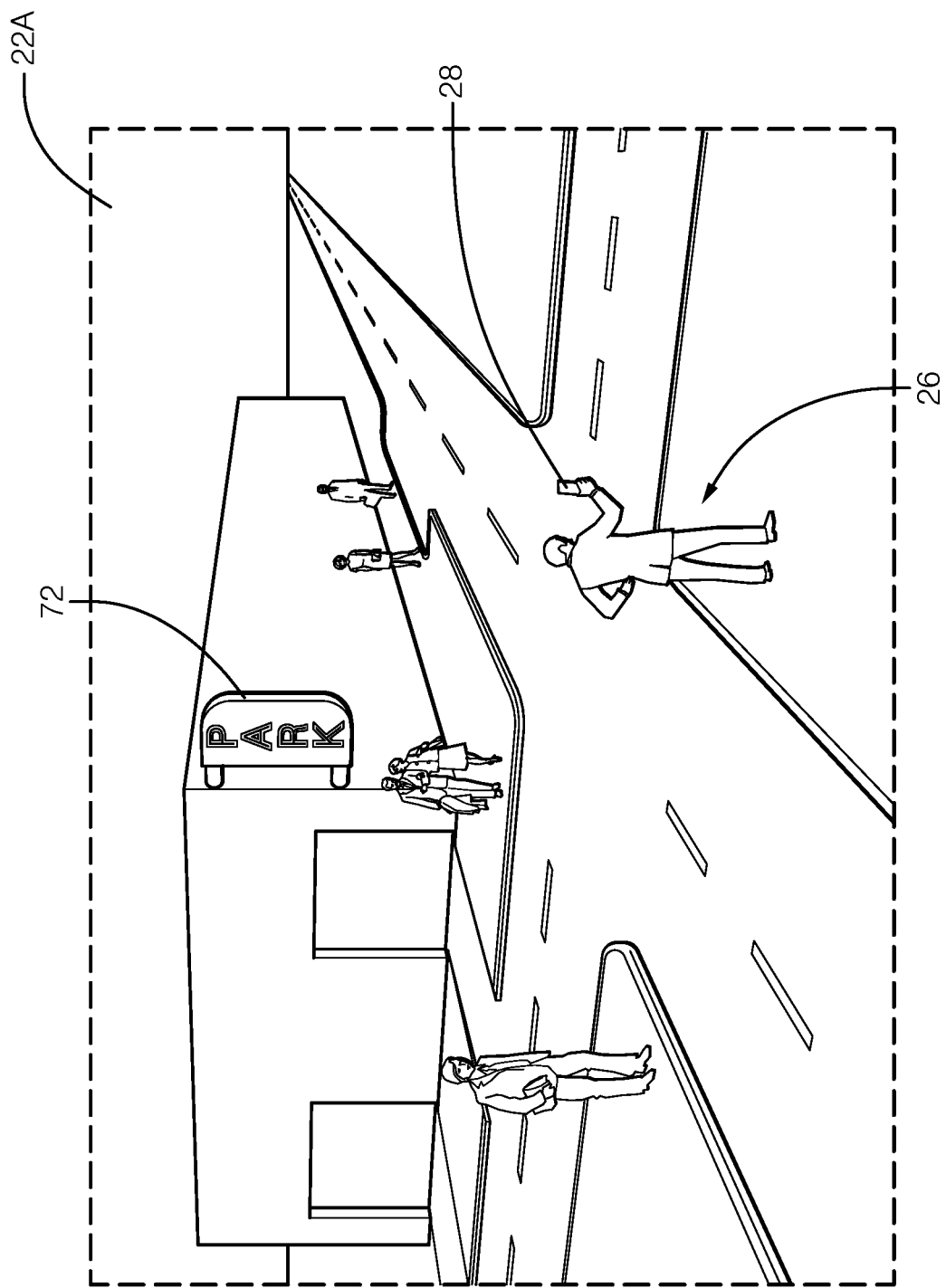
FIG. 17A shows an image of a portion of the environment.

FIG. 17A shows a first image 22A of a portion of the environment 24. In one example, the object indicator module 10 receives the first image 22A from a traffic camera 42A (FIG. 15). In another example, the first image 22A is based on a combination of captured images. For example, the first image 22A may be based on a combination of images taken by cameras on opposite sides (i.e. the front side or display side, and the back side) of the phone 28.

Figure 17B:
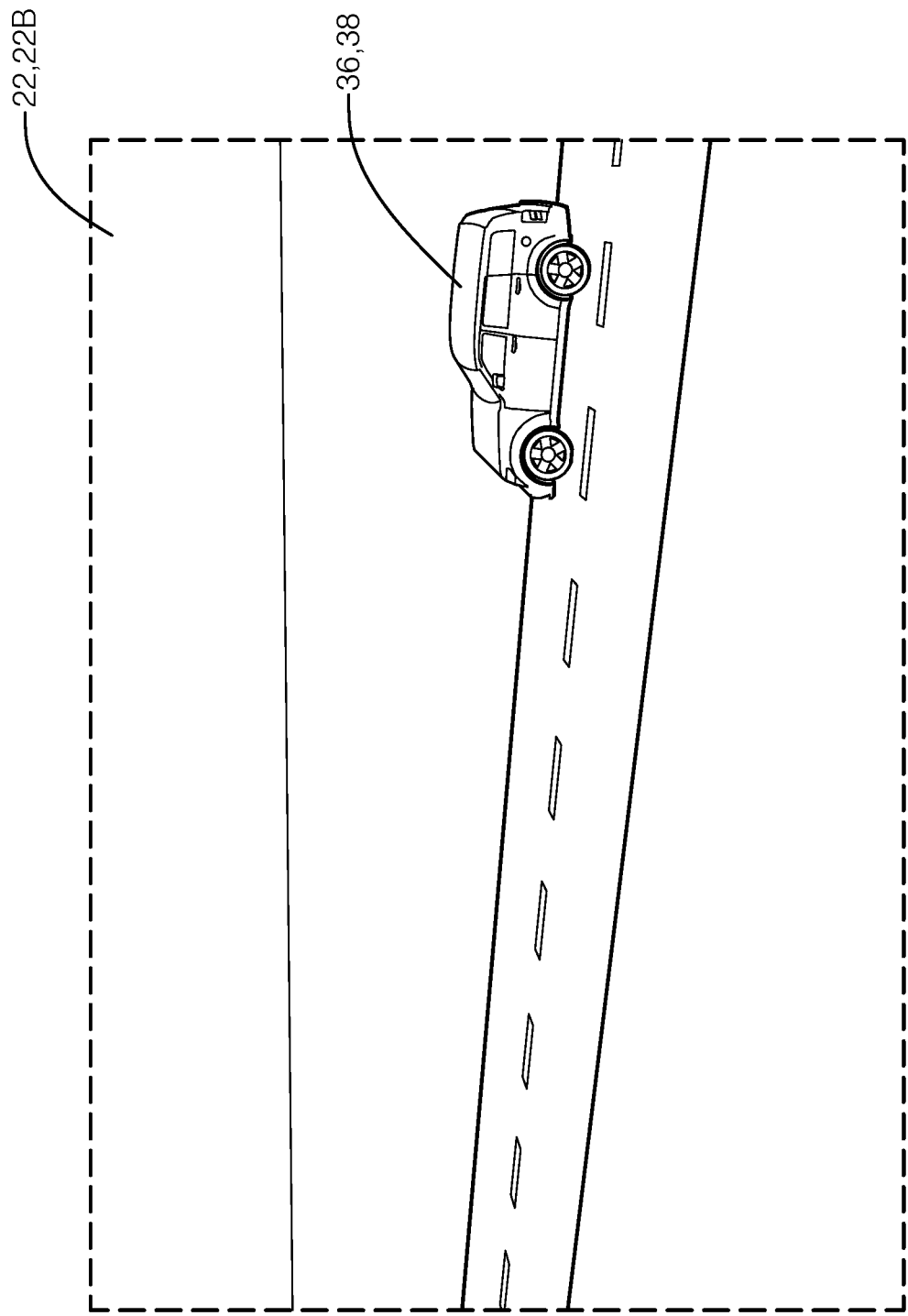
FIG. 17B shows an image of a portion of the environment different from FIG. 17A.

FIG. 17B shows a second image 22B of a portion of the environment 24 that is different from the portion depicted in the first image 22A. The second image is from an infrastructure device 42 (FIG. 15). In this example, there is no overlap of the first image 22A and the second image 22B. In other examples, there may be overlap of the two images, or overlap may occur because the object indicator module 10 receives images from more than two sources, e.g. more than two cameras.

Figure 17C:
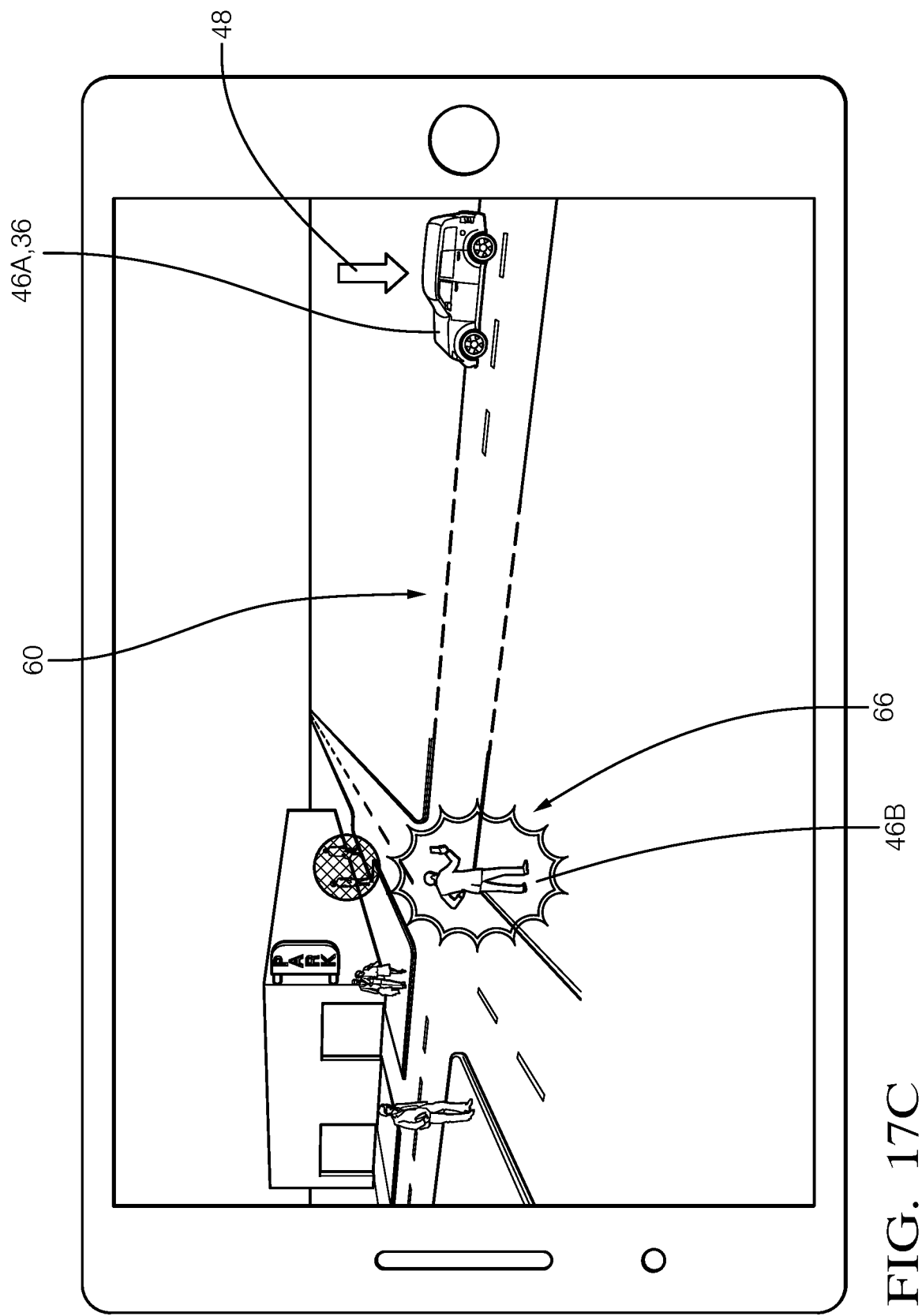
FIG. 17C shows a modification of a combination of the captured images of FIG. 17A and FIG. 17B displayed on a smart phone.

FIG. 17C shows a non-limiting example of a modified image 44B displayed on a smart phone. The object indicator module 10 determines the extents of the portions of the environment 24 covered by the first image 22A and the second image 22B. The object indicator module 10 may determine the extents based on GPS coordinates of the devices used to capture the first image 22A and the second image 22B. The object indicator module 10 may further determine the extents based on information about each of the devices. For example, the information may specify a viewing angle of a camera or other device (e.g. radar unit or lidar unit) used to capture images.

For the examples of FIGS. 17A-C, there is no overlap of the first image 22A and the second image 22B. The object indicator module 10 may indicate a void area 60 where the environment 24 is not covered by any captured images use for the modified image 44B. In this example, the void area 60 is depicted by dashed lines that correspond to the curb or boundary of the roadways. In another example (not shown), the void area 60 is blank in the modified image 44B. In another example (not shown), the object indicator module 10 adds details to the void area 60 based on images retrieved from, for example, Google maps.

Returning now to FIG. 14, the system 54 is described with reference to various drawings indicated below. In one example, the object indicator module 10 communicates with one or more perception sensors 56A, 56B. In one example, the one or more perception sensors 56A, 56B include a first perception sensor, e.g. the traffic camera 42A (FIG. 15), and a second perception sensor 56B, e.g. the infrastructure device 42. In contrast to prior examples, the phone 28 (FIG. 15) does not provide a captured image for this example. The first perception sensor 56A captures the first image 22A. The first image 22A includes or depicts the subject 26. The second perception sensor 56B captures the second image 22B. The second image 22B includes or depicts the object 38. In this example, the object indicator module 10 provides or determines the modified image 44B (FIG. 17C) based on the first image 22A and the second image 22B. The two perception sensors may be two distinct cameras. However, the first image 22A and the second image 22B may both come from a single camera with a scanning feature, e.g. a rotating mirror. The two images may partially overlap, or may not overlap at all. The subject 26 may be only present in the first image 22A and the object 38 may only be present in the second image 22B, or one or both the subject 26 or the object 38 may be in both the first image 22A and the second image 22B. The object indicator module 10 may update the modified image 44B in real time as subject 26 re-aims the camera of the phone 28 so that the location of the object 38 is within the field of view of the camera, i.e. so that object 38 becomes present in the first image 22A. The object indicator module 10 may "stitch together" various images to form a composite image. Stitching the images together may include comparing the content of the first image 22A and the second image 22B, and identifying an area of overlap, or adding a void area 60 to the modified image 44B. Alternatively, or additionally, the void area 60 may be determined based on a previously stored 3D model of the environment 24 and then synthesizing part of the modified image 44A from the 3D model.

A camera may be used to capture any image (e.g. 22, 22A, 22B) for the modified image 44A or 44B. The cameras may be one of: associated with a mobile device 58 of the subject 26, e.g. a smartphone or tablet of the subject 26, or wearable device worn by the subject 26. The camera may also be associated with the object 38, e.g. part of the perception sensor 34 of the approaching vehicle 36. The camera may also be a "smart-city" camera, traffic observation camera, general use security/surveillance camera, camera at transportation center specifically intended for use to generate modified image, a camera associated with a person in or near the environment other than the subject, and therefore not associated with the mobile device 58 or the object 38.

Figure 18:
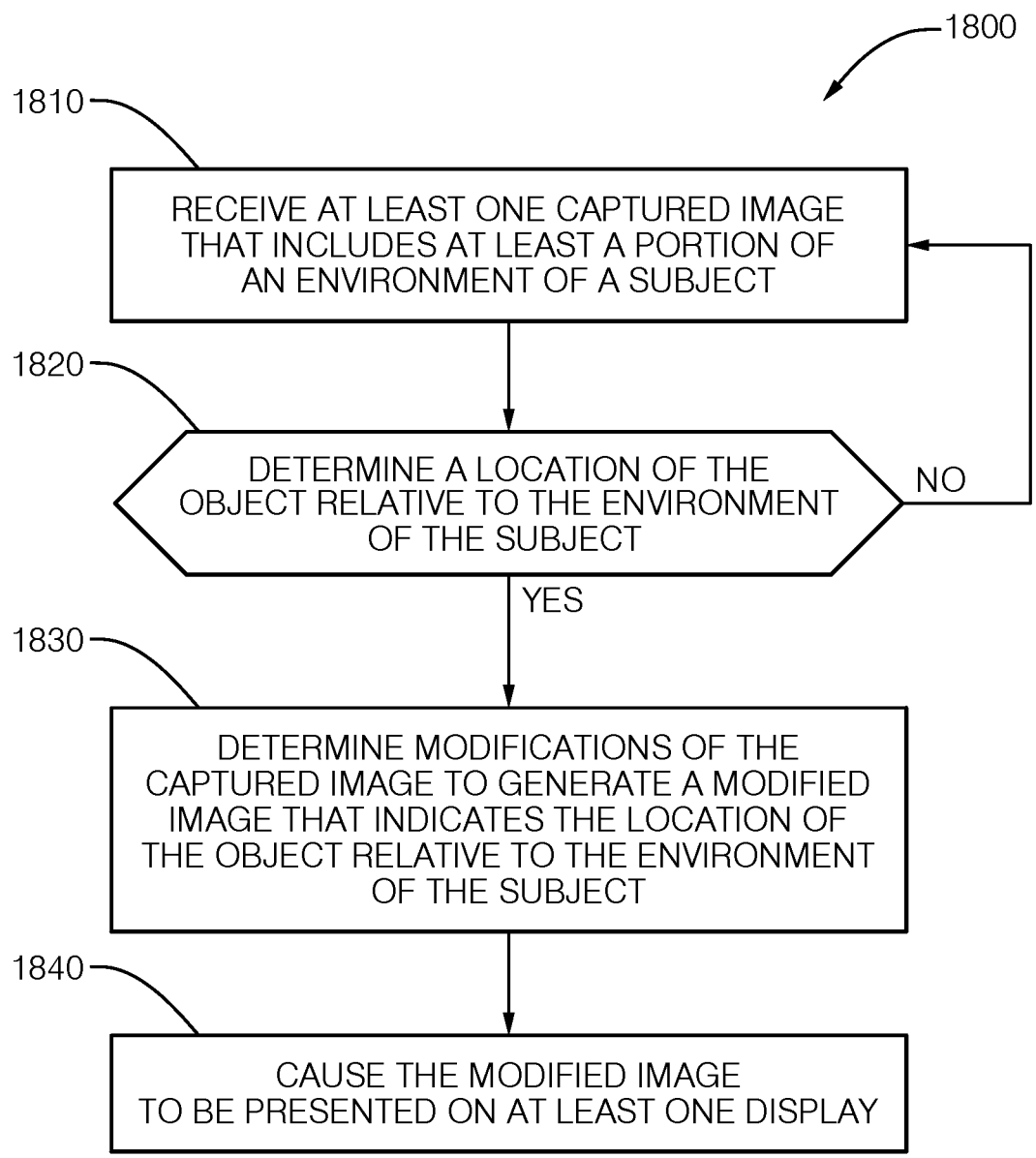
FIG. 18 show a method of operating the object indicator module of FIG. 13.

FIG. 18 illustrates on non-limiting example of a method 1800 to indicate a location 40 of an object 38. In one example, the object indicator module 10 described herein executes the method 1800. As shown in FIG. 18, the method 1800 includes receiving at least one captured image 22 that includes at least a portion of an environment 24 of a subject 26 (step 1810). The captured image 22 may be a single snapshot, a short burst, e.g. 3 frames, or video from a camera, a return map from a radar unit, a point cloud from a lidar unit, or any combination/fusion thereof.

In one example, the portion of the environment 24 is the field of view of a camera, e.g. a 90-degree field of view of the 360-degree environment 24. As used herein, the environment 24 is the area around or nearby the subject 26, i.e. viewable by the subject. The environment 24 includes, but is not limited to: streets, buildings, signs, vehicles, pedestrians, etc. In one example scenario, the object 38 is a waiting or approaching vehicle, and subject 26 is a pedestrian who electronically hailed or is looking for transportation. In another example scenario, the object 38 is a transportation site or transportation kiosk, and subject is a pedestrian. In another example scenario, the object 38 is a waiting or approaching vehicle and subject 26 is a transportation site.

As shown in FIG. 18, the method 1800 includes determining a location of an object relative to the environment of the subject (step 1820). The location 40 may be expressed in terms of GPS coordinates or distance/direction from the subject or some reference object, e.g. a landmark/building. The GPS coordinates may be reported/broadcast by object 38, or calculated based on the distance and direction from a reference point having known GPS coordinates. The values of distance and direction may be measured from an image of the object, and/or determined from a radar return or lidar point cloud.

As shown in FIG. 18, the method 1800 includes, in response to determining the location 40 of the object 38, determining modifications of the captured image 22 that may be used to generate a modified image that indicates the location 40 of the object 38 relative to the environment 24 (step 1830). In one example, determining the modifications includes performing a perspective transition of a captured image 22 so the modified image 44A has a perspective of the environment 24 that corresponds to that of the person viewing the environment 24. For example, if the captured image 22 is from a camera mounted five meters above ground level, i.e. about three meters above the eyes of the person, the perspective of the captured image 22 is translated so the modified image appears to be taken from about two meters above ground level. Other possible modifications are described above in the description of the image modifier module 18.

As used herein, example scenarios for the object 38 and the subject 26 include, but not limited to, scenarios where: the object 38 is a vehicle and the subject 26 is a pedestrian; the object 38 is a transportation site and subject 26 is a pedestrian; and the object 38 is a vehicle and the subject 26 is a transportation site.

As shown in FIG. 18, the method 1800 includes causing the modified image to be presented on at least one display (step 1840). In one example, the display module 20 outputs or transmits the modified image to the display 52. In another example, the display module 20 only transmits the modifications, and the display 52 combines the modifications and the captured image 22 to provide the modified image 44A. The display 52 may be the display of a smart phone, watch, or tablet, or a computer or television monitor located at a transportation site.

Another example of the method 1800 includes determining modifications of the captured image 22 to indicate a position 66 (FIGS. 4B and 5C) of the subject 26 relative to the modified image 44A. In one example, the modified image 44A shows an image of the subject 26, see FIG. 17C. In another example, the modified image 44A shows a symbol 68 that corresponds to the location of the subject 26 within the modified image 44A, see FIG. 16B. In another example, if subject 26 is out-of-frame, the modified image 44A shows an indicator (not shown in figures, but comparable to arrow 48 in FIG. 16B) to indicate a direction and/or distance to the subject 26. In another example for the scenario where the object 38 is the transportation site 26B, the modified images includes a suggested path 70 (FIG. 16B) for a pedestrian/client to follow to transportation site 26B.

Another example of the method 1800 includes determining modifications of the captured image 22 to indicate the location 40 of the object 38 and/or the position 66 of the subject 26 in the modified image 44A. Examples of the modifications include, but are not limited to: adjusting a color of the displayed object 46A and/or the displayed subject 46B, e.g. color the object/subject red; highlighting the displayed object 46A; and/or the displayed subject 46B, e.g. overlay the object/subject with a colored shape, e.g. circle or square, shape may be filled or just an outline; change or vary the contrast of object/subject with respect to the remainder of the modified image 44A, show object/subject in-focus and the remainder of modified image 44A out-of-focus; generating one or more graphic overlays that indicate the location of the object/subject; generating an arrow pointing towards the object/subject; generating a distance indicator indicative of a distance between the subject and the object; show indicator that indicates an ETA for AMOD to arrive at a pickup location, e.g. the transportation site 26B; and generating a compass indicator 48 indicative of a direction from the subject to the object (or from the object to the subject).

Another example of the method 1800 includes determining the location 40 of the object 38. Examples of determining the location 40 include, but are not limited to: receiving global positioning system (GPS) data of the object 38; determining a relative location of the object relative to a landmark 72 (e.g. an identifiable building) in the at least one captured image; receiving a radar data (not shown, indicates distance and direction to a target) of the object 38 relative to a radar unit; and receiving a point cloud (not shown, indicates distance and direction to a target) of the object 38 relative to a lidar unit.

In another example of the method 1800, the subject 26 is present in a first image 22A of the at least one captured image, and the object 38 is present in a second image 22B of the at least a one different captured image. The first image 22A covers a first portion 76 of the environment 24, and the second image 22B covers a second portion 78 of the environment 24 different from the first portion 76. The first image 22A and second image 22B may be from the same camera or from different cameras. In this example, the first image 22A and second image 22B do not overlap. However, in other examples the images may partially overlap. As shown in FIGS. 5A and 5B the subject 26 is only present in the first image 22A and the object 38 is only be present in the second image 22B.

For this example, determining modifications of the captured images includes combining the first image 22A and the second image 22B to generate the modified image 44A. Combining may be merely stitching the images together, which may include comparing the content of the first image 22A and the second image 22B and identifying overlap between the first environment and the second environment. Or, as shown in FIGS. 5A-5C, determining the modifications includes adding a void area 60 to the modified image 44A because there is a separation between the first image 22A and the second image 22B, i.e. there is no overlap. In another example the void area 60 is synthesized from Google map images and/or a 3D model of the environment 24.

In one example, the image capture module 12 merely receives the captured images. In another example the image capture module 12 operates one or more of the cameras. Each instance of the cameras may be associated with a mobile device 58 of the subject 26 (e.g. a smartphone or tablet of the pedestrian 26A, or wearable device worn by the pedestrian 26A); or associated with the object 38 (the object 38 is a motor vehicle, and the camera is part of a perception sensor 34 of the vehicle); or not associated with the mobile device 58 or the object 38 (e.g. a "smart-city" camera, traffic observation camera, general use security/surveillance camera, camera at transportation center specifically intended for use to generate modified image, a camera associated with a person in or near the environment other than the subject 26).

In another example, the method 1800 includes determining that a distance between the object 38 and the subject 26 is increasing, e.g. the approaching vehicle 36 has turned and is traveling away from the pedestrian 26A, or the pedestrian 26A walking in the wrong direction, i.e. is walking away from the transportation site 26B. In response to determining that the distance is increasing, the method 1800 includes determining modifications of the captured image 22 to convey a notification (e.g. and added symbol on the modified image 44A, or a text message, or activating a sound on the phone 28) that the object 38 and subject 26 are moving further apart. In one example, the arrow 48 or the suggested path 70 changes from green to red, and/or flashes.

Described herein is a non-tangible computer readable storage medium 62 that stores instructions (steps 110-140, FIG. 18) configured to cause a processing device 64 to: receive (step 1810) at least one captured image 22 that includes at least a portion of an environment 24 of a subject 26, determine a location 40 of an object 38 relative to the environment 24 of the subject 26, in response to determining the location 40, modify the captured image 22 to generate a modified image 44A that indicates the location 40 of the object 38 relative to the environment 24, and cause the modified image 44A to be displayed on the at least one display 52. In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

CLAUSES

1. A method (1800) comprising:
   receiving (1800) at least one captured image (22, 22A, 22B) that includes at least a portion of an environment (24, 190) of a subject (26);
   determining (1820) a location (40) of an object (38) relative to the environment (24, 190) of the subject (26);
   in response to determining the location (40) of the object (38), determining (1830) modifications of the at least one captured image (22, 22A, 22B) to generate a modified image (44A) that indicates the location (40) of the object (38) relative to the environment (24, 190); and
   causing (1840) the modified image (44A) to be presented on at least one display (52A, 52B, 312).
2. The method (1800) of clause 1, wherein the object (38) and the subject (26) are at least one of:
   the object (38) is a vehicle and the subject (26) is a pedestrian (26A);
   the object (38) is a transportation site and subject (26) is a pedestrian (26A); and
   the object (38) is a vehicle (36) and the subject (26) is a transportation site (26B).
3. The method (1800) of any of the previous clauses, wherein the method (1800) includes determining modifications of the at least one captured image (22, 22A, 22B) to indicate a position (66, 418) of the subject (26) relative to the modified image (44A).
4. The method (1800) of any of the previous clauses, wherein determining modifications of the at least one captured image (22, 22A, 22B) to indicate the location (40) of the object (38) in the modified image (44A) includes at least one of:
   adjusting a color of a displayed object (46A);
   highlighting the displayed object (46A);
   generating an arrow (48) pointing towards the object (38);
   generating a distance indicator (50) indicative of a distance between the subject (26) and the object (38); and
   generating a compass indicator (48) indicative of a direction from the subject (26) to the object (38).
5. The method (1800) of any of the previous clauses, wherein determining the location (40) of the object (38) includes at least one of:
   receiving global positioning system (120) (GPS (120)) data of the object (38);
   determining a relative location (40) of the object (38) relative to a landmark (72) in the at least one captured image (22, 22A, 22B);

receiving a radar data of the object (38) relative to a radar unit; and receiving a point cloud (202) of the object (38) relative to a lidar unit (123).

6. The method (1800) of any of the previous clauses, wherein a first image (22A) of the at least one captured image (22, 22A, 22B) includes both the subject (26) and the object (38).

7. The method (1800) of any of the previous clauses, wherein the subject (26) is present in a first image (22A) of the at least one captured image (22, 22A, 22B), said first image (22A) covers a first portion (76) of the environment (24, 190), the object (38) is present in a second image (22B) of the at least one captured image, said second image (22B) covers a second portion (78) of the environment (24, 190) different from the first portion (76).

8. The method (1800) of clause 7, wherein determining modifications of the at least one captured image includes combining the first image (22A) and the second image (22B).

9. The method (1800) of any of the previous clauses, wherein the method (1800) includes operating a camera (30) to capture the at least one captured image (22, 22A, 22B).

10. The method (1800) of clause 9, wherein the camera (30) is one of:

associated with a mobile device (58) of the subject (26);

associated with the object (38); and not associated with the mobile device (58) of the subject (26) or the object (38).

11. The method (1800) of any of the previous clauses, further comprising:

determining that a distance (50) between the object (38) and the subject (26) is increasing; and in response to determining that the distance (50) is increasing, determining modifications of the at least one captured image (22, 22A, 22B) to convey a notification that the object (38) and subject (26) are moving further apart.

12. A system (120) comprising:

an object indicator module (10) that receives at least one captured image (22, 22A, 22B) that includes at least a portion of an environment (24, 190) of a subject (26);

determines a location (40) of an object (38) relative to the environment (24, 190) of the subject (26);

in response to determining the location (40) of the object (38), determines modifications of the at least one captured image (22, 22A, 22B) to generate a modified image (44A) that indicates the location (40) of the object (38) relative to the environment (24, 190); and causes the modified image (44A) to be presented on at least one display (52A, 52B, 312).

13. The system (120) of clause 12, wherein the system (120) further comprises:

one or more perception sensors (56A) that provide the at least one captured image (22, 22A, 22B).

14. The system (120) of clause 13, wherein an instance of the one or more perception sensors (56A) and the display (52A) are part of a mobile device (58).

15. The system (120) of clause 13 or 14, wherein the one or more perception sensors (56A) includes a first perception sensor (56A) that captures a first image (22A) that includes the subject (26); and a second perception sensor (56B) that captures a second image (22B) that includes the object (38), said second perception sensor (56B) different from said first perception sensor (56A), and the modified image (44A) is determined in accordance with the first image (22A) and the second image (22B).

16. The system (120) of clauses 13 to 15, wherein at least one instance of the one or more perception sensors (56A) includes a camera (30).

17. The system (120) of clause 16, wherein the camera (30) is one of:

associated with a mobile device (58) of the subject (26);

associated with the object (38); and not associated with the mobile device (58) of the subject (26) or the object (38).

18. A non-tangible computer readable storage medium (62) that stores instructions configured to cause a processing device (64) to:

receive at least one captured image (22, 22A, 22B) that includes at least a portion of an environment (24, 190) of a subject (26);

determine a location (40) of an object (38) relative to the environment (24, 190) of the subject (26);

in response to determining the location (40), modify the at least one captured image (22, 22A, 22B) to generate a modified image (44A) that indicates the location (40) of the object (38) relative to the environment (24, 190); and cause the modified image (44A) to be displayed on the at least one display (52A, 52B, 312).

A method (1800) of operating as object indicator module (10) includes capturing at least one image (612), said captured image (22, 22A, 22B) covers at least a portion of an environment (24, 190) of a subject (26), determining a location (40) of an object (38) relative to the environment (24, 190) of the subject (26), in response to determining the location (40) of the object (38), determining modifications of the captured image (22, 22A, 22B) to generate a modified image (44A) that indicates the location (40) of the object (38) relative to the environment (24, 190), and causing the modified image (44A) to be presented on at least one display (52A, 52B, 312).

What is claimed is:

1. A method comprising:

receiving a first image that is captured by a first perception sensor of an infrastructure device, the first image including a first portion of an environment of a subject, the environment being based on a location of a user device associated with the subject;

determining a location of an object relative to the environment of the subject;

receiving a second image that is captured by a second perception sensor of an infrastructure device, the second image including the object and a second portion of the environment, the second portion of the environment non-overlapping the first portion of the environment;

in response to determining the location of the object and the subject, comparing the content of the first image and the second image, determining a void area based on a previously stored 3D model of the environment, combining the first captured image, the second captured image, and a void area not captured in the first image or the second image to generate a modified image that indicates the location of the object relative to the environment of the subject including a void area depicted by dashed lines that correspond to the curb or boundary of the roadways; and causing the modified image to be presented on at least one display of a second device located near the subject, the second device being different than the user device.

2. The method of claim 1, wherein the object is a vehicle and the subject is a pedestrian.

3. The method of claim 1, wherein the modified image indicates a position of the subject relative to the modified image.

4. The method of claim 1, wherein generating the modified image includes at least one of:
adjusting a color of a displayed object;
highlighting the displayed object;
generating an arrow pointing towards the object;
generating a distance indicator indicative of a distance between the subject and the object; and
generating a compass indicator indicative of a direction from the subject to the object.

5. The method of claim 1, wherein determining the location of the object includes at least one of:
receiving global positioning system (GPS) data of the object;
determining a relative location of the object relative to a landmark in the first image or in the second captured image;
receiving a radar data of the object relative to a radar unit; and
receiving a point cloud of the object relative to a lidar unit.

6. The method of claim 1, wherein the method includes operating a camera to capture the at least one of the first captured image and the second captured image.

7. The method of claim 1, further comprising:
determining that a distance between the object and the subject is increasing; and in response to determining that the distance is increasing, generating the modified image to convey a notification that the object and subject are moving further apart.

8. A system comprising:
a processor configured to execute an object indicator module that when executed at the processor:
receives a first image that is captured by a first perception sensor of an infrastructure device, the first image including a first portion of an environment of a subject, the environment being based on a location of a user device associated with the subject;
determines a location of an object relative to the environment of the subject;
receives a second image that is captured by a second perception sensor of an infrastructure device, the second image including the object and a second portion of the environment, the second portion of the environment non-overlapping the first portion of the environment;
in response to determining the location of the object and the subject, compares the content of the first image and the second image, determines a void area based on a previously stored 3D model of the environment, and combines the first captured image, the second captured image, and a void area not captured in the first image or the second image to generate a modified image that indicates the location of the object relative to the environment of the subject including a void area depicted by dashed lines that correspond to the curb or boundary of the roadways; and
causes the modified image to be presented on at least one display of a second device located near the subject, the second device being different than the user device.

9. The system of claim 8, wherein at least one instance of the first perception sensor or the second perception sensor includes a camera.

10. The system of claim 8, wherein the object is another vehicle and the subject is a pedestrian.

11. The system of claim 8, wherein the modified image indicates a position of the subject relative to the modified image.

12. The system of claim 8, wherein the object indicator module, when executed at the processor, further: generates the modified image includes at least one of:
adjusts a color of a displayed object;
highlights the displayed object;
generates an arrow pointing towards the object;
generates a distance indicator indicative of a distance between the subject and the object; and
generates a compass indicator indicative of a direction from the subject to the object.

13. The system of claim 8, wherein the object indicator module, when executed at the processor, determines the location of the object by at least one of:
receiving global positioning system (GPS) data of the object;
determining a relative location of the object relative to a landmark in the first image or in the second image;
receiving a radar data of the object relative to a radar unit; and
receiving a point cloud of the object relative to a lidar unit.

14. A non-tangible computer readable storage medium that stores instructions that when executed cause a processing device to:
receive a first image that is captured by a first perception sensor of an infrastructure device, the first image including a first portion of an environment of a subject, the environment being based on a location of a user device associated with the subject;
determine a location of an object relative to the environment of the subject;
receives a second image that is captured by a second perception sensor of an infrastructure device, the second image including the object and a second portion of the environment, the second portion of the environment non-overlapping the first portion of the environment;
in response to determining the location of the object and the subject, compare the content of the first image and the second image, determine a void area based on a previously stored 3D model of the environment, and combine the first captured image, the second captured image, and a void area not captured in the first image or the second image to generate a modified image that indicates the location of the object relative to the environment of the subject including a void area depicted by dashed lines that correspond to the curb or boundary of the roadways; and
cause the modified image to be presented on at least one display of a second device located near the subject, the second device being different than the user device.

15. The non-tangible computer readable storage medium of claim 14, wherein the object is a vehicle and the subject is a pedestrian.

16. The non-tangible computer readable storage medium of claim 14, wherein the modified image indicates a position of the subject relative to the modified image.

17. The non-tangible computer readable storage medium of claim 14, wherein the instructions, when executed, further cause the processing device to:
generate the modified image includes at least one of:
adjust a color of a displayed object; highlight the displayed object;
generate an arrow pointing towards the object;
generate a distance indicator indicative of a distance between the subject and the object; and generate a compass indicator indicative of a direction from the subject to the object.

18. The non-tangible computer readable storage medium of claim 14, wherein the instructions, when executed, further cause the processing device to determine the location of the object by at least one of:
- receiving global positioning system (GPS) data of the object;
- determining a relative location of the object relative to a landmark in the first image or in the second image;
- receiving a radar data of the object relative to a radar unit; and
- receiving a point cloud of the object relative to a lidar unit.

19. The non-tangible computer readable storage medium of claim 14, wherein at least one instance of the first perception sensor or the second perception sensor includes a camera.

* * * * *